US008866789B2

(12) United States Patent
Rimon et al.

(10) Patent No.: US 8,866,789 B2
(45) Date of Patent: Oct. 21, 2014

(54) SYSTEM AND METHOD FOR CALIBRATION OF A CAPACITIVE TOUCH DIGITIZER SYSTEM

(75) Inventors: Ori Rimon, Tel-Aviv (IL); Ariel Kerner, Herzlia (IL); Michael Birnboim, Jaffa (IL)

(73) Assignee: N-trig Ltd., Kfar-Saba (IL)

( * ) Notice: Subject to any disclaimer, the term of this patent is extended or adjusted under 35 U.S.C. 154(b) by 1446 days.

(21) Appl. No.: 12/007,881

(22) Filed: Jan. 16, 2008

(65) Prior Publication Data

US 2008/0170046 A1    Jul. 17, 2008

Related U.S. Application Data

(60) Provisional application No. 60/880,369, filed on Jan. 16, 2007.

(51) Int. Cl.
*G06F 3/044* (2006.01)
*G06F 3/041* (2006.01)

(52) U.S. Cl.
CPC .............. *G06F 3/0418* (2013.01); *G06F 3/044* (2013.01)
USPC ....................................................... 345/174

(58) Field of Classification Search
CPC ............................... G06F 3/0418; G06F 3/044
USPC .......................................... 345/170, 173–741
See application file for complete search history.

(56) References Cited

U.S. PATENT DOCUMENTS

| | | | |
|---|---|---|---|
| 6,075,520 A | 6/2000 | Inoue et al. | |
| 6,404,353 B1 * | 6/2002 | Coni et al. | 341/33 |
| 7,643,011 B2 * | 1/2010 | O'Connor et al. | 345/173 |
| 2002/0056575 A1 * | 5/2002 | Keely et al. | 178/18.01 |
| 2003/0066692 A1 * | 4/2003 | Devige et al. | 178/18.04 |
| 2003/0206162 A1 | 11/2003 | Roberts | |
| 2005/0083313 A1 * | 4/2005 | Hardie-Bick | 345/177 |
| 2006/0146033 A1 * | 7/2006 | Chen et al. | 345/173 |
| 2006/0227116 A1 | 10/2006 | Zotov et al. | |
| 2008/0170046 A1 | 7/2008 | Rimon et al. | |

FOREIGN PATENT DOCUMENTS

| | | |
|---|---|---|
| JP | 10-233670 | 9/1998 |
| JP | 2002-342033 | 11/2002 |
| JP | 2006-517319 | 7/2006 |
| WO | WO 2004/070396 | 8/2004 |
| WO | WO 2006/130584 | 12/2006 |
| WO | WO 2008/087638 | 7/2008 |

OTHER PUBLICATIONS

Examination Report Under Section 28(3) Dated Sep. 30, 2009 From the Intellectual Property Office of the United Kingdom Re.: Application No. GB0914305.8.
Response Dated Nov. 2, 2009 to Examination Report Under Section 28(3) of Sep. 30, 2009 From the Patent Office of the United Kingdom Re.: Application No. 0914305.8.

(Continued)

*Primary Examiner* — Quan-Zhen Wang
*Assistant Examiner* — Tony Davis

(57) ABSTRACT

A method for calibration of a capacitive touch digitizer system comprises detecting patterns of signals from a plurality of different events over a course of user interaction with the digitizer system, wherein the patterns of signals are outputs from a digitizer sensor of the system, determining a number of times that a pattern of signals is repeated over the different events, and defining a map of offset values as a pattern of signals that is repeated above a pre-defined repetition threshold.

70 Claims, 13 Drawing Sheets

(56) References Cited

OTHER PUBLICATIONS

International Preliminary Report on Patentability Dated Jul. 30, 2009 From the International Bureau of WIPO Re.: Application No. PCT/IL2008/000068.

International Search Report Dated Jun. 5, 2008 From the International Searching Authority Re.: Application No. PCT/IL2008/000068.

Written Opinion Dated Jun. 5, 2008 From the International Searching Authority Re.: Application No. PCT/IL2008/000068.

Rekimoto "SmartSkin: An Infrastructure for Freehand Manipulation on Interactive Surfaces", CHI 2002, Minneapolis, Minnesota, USA, Apr. 20-25, 2002, 4(1): 113-120, 2002.

Translation of Notice of Reason for Rejection Dated Aug. 31, 2012 From the Japanese Patent Office Re. Application No. 2009-546067.

\* cited by examiner

SYSTEM AND METHOD FOR CALIBRATION OF A CAPACITIVE TOUCH DIGITIZER SYSTEM

RELATED APPLICATION

The present application claims the benefit under section 35 U.S.C. §119(e) of U.S. Provisional Application No. 60/880, 369 filed on Jan. 16, 2007 which is hereby incorporated by reference in its entirety.

FIELD OF THE INVENTION

The present invention, in some embodiments thereof, relates to capacitive touch digitizing tablet systems and more particularly, but not exclusively, to calibration of capacitive touch digitizing tablet systems.

BACKGROUND OF THE INVENTION

Capacitive touch digitizing tablet systems that allow a user to operate a computing device with a stylus and/or fingertip are known. Typically, a digitizer is integrated with a display screen, e.g. over-laid on the display screen, to correlate user input, e.g. physical touch or stylus interaction on the screen with the virtual information portrayed on it. Position detection of the stylus and/or finger tip provides input to the computing device and is interpreted as user commands. In some embodiments of the present invention, the capacitive touch digitizing system is configured only for touch, e.g. capacitive touch digitizing system for mobile telephones.

U.S. Pat. No. 6,690,156 entitled "Physical Object Location Apparatus and Method and a Platform using the same" assigned to N-trig Ltd, and U.S. Pat. No. 7,292,229 entitled "Transparent Digitizer" also assigned to N-Trig Ltd, both of which are hereby incorporated by reference in their entirety, describe a digitizing tablet system capable of detecting position of a user input, e.g. physical object, game pieces and/or a styluses, including an electrical circuit, either active or passive. Typically, the system includes a transparent digitizer overlaid on a Flat Panel Display (FPD). The digitizer includes a matrix of vertical and horizontal conducting lines and sensors to sense an electric signal passing through the vertical and horizontal conductive lines. Positioning the physical object at a specific location on the digitizer provokes a signal whose position of origin may be detected.

U.S. Pat. No. 6,750,852 entitled "Object position detector with edge motion feature and Gesture Recognition" assigned to Synaptics, Inc. which is hereby incorporated by reference in its entirety, describes a method for recognizing a gesture made on a touch-sensor pad in a touch-sensing system providing X and Y position information to a host.

U.S. Pat. No. 6,750,852 additionally describes an adaptive analog technique to overcome offset and scale differences between channels. According to the disclosure in U.S. Pat. No. 6,750,852, calibration is performed in real time (via long time constant feedback) to zero out any long term effects due to sensor environmental changes. Calibration is based on offset values read when no object is thought to be present at the touch sensor. The absence of an object is determined by comparing sensed pressure measurements to pressure measurements that may be typical of measurements when no finger is present.

U.S. Patent Application Publication No. 20040155871 entitled "Touch Detection for a Digitizer" assigned to N-trig Ltd, which is hereby incorporated by reference in its entirety, describes a digitizing tablet system capable of detecting position of both physical objects and finger touch using the same sensing conductive lines. Typically, the system includes a transparent sensor overlaid on a Flat Panel Display (FPD). The digitizer's sensor includes a matrix of vertical and horizontal conducting lines to sense an electric signal passing through the vertical and horizontal conductive lines. Touching the digitizer in a specific location provokes a signal whose position of origin may be detected.

U.S. Patent Application Publication No. 20040155871 additionally describes parasitic capacitance developed between the display screen and the conductive lines of the overlaying digitizer sensor. Slight differences in distance between the digitizer and screen, material structure in specific areas of the digitizer screen, environmental conditions and parasitic capacitance on associated PCB, may affect the parasitic capacitance level between the screen and some of the lines. The unbalanced capacitance creates an unbalance steady state signal the lines, e.g. an offset signal and/or background signal. The result is a different steady state signal on each of the lines that will result in an amplified non-zero steady state signal being produced by the differential amplifier. In some exemplary embodiments, detection is based on an AC signal crossing at junctions of conductive lines by virtue of the capacitance of the finger. In such embodiments, parasitic capacitance may result in a different steady state signal on each of the junctions. The presence of these offset signals may reduce the level of accuracy possible in detecting, for example, a user's finger's location.

U.S. Patent Application Publication No. 20040155871 describes a mapping solution that may be used to compensate for the display panel offset signal phenomenon. During an initialization procedure, magnitude and phase of the difference signals for each pair of conducting lines connected to a differential amplifier is detected and stored. Once the differential map is stored in memory, it can be used to compensate for the display panel offset signal phenomenon. Offset in the signal may cause saturation when sampling the signal that cannot be compensated for with the mapping solution.

U.S. Patent Application Publication No. 20060227114 entitled "Touch location determined with error correction for sensor movement" assigned to 3M Innovative Properties Company, which is hereby incorporated by reference in its entirety, describes a touch sensitive device including a capacitive touch sensor configured to generate signals indicative of a location of a capacitively coupled touch on a touch surface, an error correction sensor configured to generate a signal associated with an error in the touch location signals, the error associated with movement of the capacitive touch sensor; and a processor configured to determine the touch location based on the touch location signals and the error signal.

U.S. Patent Application Publication No. 20060267953 entitled "Detection of and compensation for stray capacitance in capacitive touch sensors" assigned to 3M Innovative Properties Company, which is hereby incorporated by reference in its entirety, describes a system and method for detecting stray capacitance in a touch sensor system. The system includes a capacitive touch sensor having a resistive layer covering an active area, and electronics coupled to a plurality of locations on the resistive layer for determining touch position based on currents flowing through the plurality of locations due to capacitive coupling of a touch implement with the resistive layer. The method includes determining a test touch position when a detected signal level exceeds a threshold value and using the test touch position to determine existence or absence of stray capacitance.

U.S. Patent Application Publication No. 20070268272 entitled "Variable Capacitor Array" assigned to N-trig Ltd, which is hereby incorporated by reference in its entirety, describes a digitizer sensor including pairs of conductive lines coupled to differential amplifiers through which a difference signal is detected, and capacitors operative to balance differences in parasitic capacitance between the conductive lines.

SUMMARY OF THE INVENTION

An aspect of some embodiments of the present invention is the provision of systems and methods for adaptively zeroing out detected offsets of a capacitive touch digitizer output during user interaction with the digitizer. According to some embodiment of the present invention, offsets for each of the conductive lines of the digitizer system and/or for each of the cross lines of the digitizer grid are mapped and zeroed out in real time, e.g during user interaction with the digitizer. One typical source of offsets in the output of the capacitive touch digitizer is parasitic capacitance. Offsets levels and patterns may change during use of the digitizer system and over time.

According to an aspect of some embodiments of the present invention there is provided a method for calibration of a capacitive touch digitizer system, the method comprising: detecting patterns of signals from a plurality of different events over a course of user interaction with the digitizer system, wherein the patterns of signals are outputs from a digitizer sensor of the system; determining a number of times that a pattern of signals is repeated over the different events; and defining a map of offset values as a pattern of signals that is repeated above a pre-defined repetition threshold.

Optionally, wherein the defining a map of offset values is performed automatically without user intervention for invoking the defining.

Optionally, the method comprises identifying an onset of a new event and selecting a representative pattern of signals from the new event.

Optionally, the new event is detected in response to a change in at least one digitizer sensor output by a magnitude above a pre-defined event threshold.

Optionally, the representative pattern of signals is the first pattern of signals sampled during the event.

Optionally, the representative pattern of signals is an average of a plurality of patterns of signals sampled during the event.

Optionally, the different events include different lift and touch events, wherein the touch events are periods during which a user interaction invokes signals on the digitizer sensor, and wherein the lift events are periods over which the object for user interaction is away from the digitizer sensor such that the object does not invoke signals on the digitizer sensor.

Optionally, the object for user interaction is a finger.

Optionally, the method comprises determining stability of the events, wherein stability is determined for an event that includes a pre-defined number of samples with a consistent pattern of signals; and excluding events that are not stable from consideration for determining the number of times that the pattern of signals is repeated over the different events.

Optionally, the method comprises: detecting a drag event, wherein a drag event is a period over which an object is dragged along the digitizer sensor; and excluding drag events from consideration when determining the number of times that the pattern of signals is repeated over the different events.

Optionally, the method comprises calculating delta patterns, wherein a delta pattern is the difference between a previous pattern of signals and a current pattern of signals; determining if the delta pattern depicts a drag event; and defining the previous and the current pattern of signals as patterns of signals derived from a drag event.

Optionally, the drag event includes outputs with a common sign in a first area on the digitizer sensor and outputs with an opposite sign in a second area adjacent to the first area on the digitizer sensor.

Optionally, the offset values are implemented to calibrate readings of digitizer sensor outputs.

Optionally, the method comprises saving at least one map of offset values in non-volatile memory.

Optionally, the method comprises saving at least one map of offset values, wherein the map is determined from a manually initiated calibration procedure.

Optionally, the method comprises saving at least one map of offset values, wherein the map is determined from a previous calibration procedure.

Optionally, the method comprises updating the map of offset values in response to detection of repetitive patterns of signals that are different than the pattern of signals implemented to define the map.

Optionally, the method comprises recording at least one of the patterns of signals detected from the plurality of different events in a repetition table.

Optionally, the method comprises comparing detected patterns of signals to patterns of signals stored in the repetition table.

Optionally, the method comprises storing a pattern of signals that is repeated at least once in a candidate table.

Optionally, the method comprises selecting the pattern of signals to be implemented as a map of the offset values from patterns of signals stored in the candidate table.

Optionally, the method comprises adjusting the pattern of signals implemented as a map of offsets to slow changes detected in the same event.

Optionally, the pattern of signals includes outputs from a plurality of conductive lines of the digitizer sensor arranged in a grid.

Optionally, the outputs from the digitizer sensor are outputs form differential amplifiers of the digitizer sensor.

Optionally, the outputs from the digitizer sensor are outputs from sensor junctions.

Optionally, the pattern of signals forms a two dimensional image.

Optionally, the pattern of signals forms a one dimensional image on each axis of the digitizer sensor According to an aspect of some embodiments of the present invention there is provided a digitizer configured for detecting a presence of an object over a digitizer sensor; a zero-state detector configured for: detecting patterns of signals from a plurality of different events over the course of user interaction with the digitizer, wherein the patterns of signals are outputs from the digitizer; determining a number of times that a pattern of signals is repeated over the different events; and defining a map of offset values as a pattern of signals that is repeated above a pre-defined repetition threshold.

Optionally, the zero-state detector is configured for defining the map of offset values automatically without user intervention for invoking the defining.

Optionally, the zero-state detector is configured for identifying an onset of a new event and selecting a representative pattern of signals from the new event.

Optionally, the zero-state detector is configured to detect the new event in response to a change in at least one digitizer sensor output by a magnitude above a pre-defined event threshold.

Optionally, the representative pattern of signals is the first pattern of signals sampled during the event.

Optionally, the representative pattern of signals is an average of a plurality of patterns of signals sampled during the event.

Optionally, the different events include different lift and touch events, wherein the touch events are periods during which an object invokes signals on the digitizer, and wherein the lift events are periods over which the object is away from the digitizer sensor such that the object does not invoke signals on the digitizer.

Optionally, the zero-state detector is configured for determining stability of the events, wherein stability is determined for an event that includes a pre-defined number of samples with a consistent pattern of signals; and for excluding events that are not stable from consideration for determining the number of times that the pattern of signals is repeated over the different events.

Optionally, the zero-state detector is configured for: detecting a drag event, wherein a drag event is a period over which an object is dragged along the digitizer sensor; and excluding drag events from consideration when determining the number of times that the pattern of signals is repeated over the different events.

Optionally, the zero-state detector is configured for: calculating delta patterns, wherein a delta pattern is the difference between a previous pattern of signals and a current pattern of signals; and determining if the delta pattern depicts a drag event; and defining the previous and the current pattern of signals as patterns of signals derived from a drag event.

Optionally, the drag event includes outputs with a common sign in a first area on the digitizer sensor and outputs with an opposite sign in a second area adjacent to the first area on the digitizer sensor.

Optionally, the system comprises a compensator, wherein the compensator is configured using the offset values for calibrating readings of digitizer sensor outputs.

Optionally, the system comprises a non-volatile memory configured for storing at least one map of offset values.

Optionally, the at least one map of offset values is a map determined from a manually initiated calibration procedure.

Optionally, the at least one map of offset values is a map determined from a previous calibration procedure.

Optionally, the zero-state detector is configured for updating the map of offset values in response to detection of repetitive patterns of signals that are different than the pattern of signals implemented to define the map.

Optionally, the zero-state detector is configured for recording at least one of the patterns of signals detected from the plurality of different events in a repetition table.

Optionally, the system comprises memory for storing the repetition table.

Optionally, the memory is volatile memory.

Optionally, the zero-state detector is configured for comparing detected patterns of signals to patterns of signals stored in the repetition table.

Optionally, the system comprises memory for storing a pattern of signals that is repeated at least once in a candidate table.

Optionally, the system comprises memory for storing the candidate table.

Optionally, the memory is volatile memory.

Optionally, the zero-state detector is configured for selecting the pattern of signals to be implemented as a map of the offset values from patterns of signals stored in the candidate table.

Optionally, the zero-state detector is configured for adjusting the pattern of signals implemented as a map of offsets to slow changes detected in the same event.

Optionally, the digitizer includes a plurality of conductive lines of the digitizer arranged in a grid; and wherein the pattern of signals includes outputs from the plurality of conductive lines of the grid.

Optionally, pairs of the conductive lines are coupled to a differential amplifier through which a difference signal is detected and wherein the outputs from the digitizer are outputs form differential amplifiers.

Optionally, the outputs from the digitizer are outputs from junctions of conductive lines of the digitizer.

Optionally, the object is a finger.

Optionally, the pattern of signals forms a two dimensional image.

Optionally, the pattern of signals forms a one dimensional image on each axis of the digitizer.

According to an aspect of some embodiments of the present invention there is provided a method for detecting a drag event performed on a capacitive touch digitizer system, wherein a drag event is a period over which an object is dragged along the digitizer sensor, the method comprising: detecting patterns of signals from a plurality of different events over a course of user interaction with the digitizer system, wherein the patterns of signals are outputs from a digitizer sensor of the system; calculating delta patterns, wherein a delta pattern is the difference between a previous pattern of signals and a current pattern of signals; and determining if the delta pattern depicts a drag event.

Optionally, the method comprises identifying an onset of a new event and selecting a representative pattern of signals from the new event.

Optionally, the new event is detected in response to a change in at least one digitizer sensor output by a magnitude above a pre-defined event threshold.

Optionally, the different events include different lift and touch events, wherein the touch events are periods during which a user interaction invokes signals on the digitizer sensor, and wherein the lift events are periods over which the object for user interaction is away from the digitizer sensor such that the object does not invoke signals on the digitizer sensor.

Optionally, the delta patterns depicting drag events includes outputs with a common sign in a first area on the digitizer sensor and outputs with an opposite sign in a second area adjacent to the first area on the digitizer sensor.

Optionally, the method comprises defining the previous and the current pattern of signals as patterns of signals derived from a drag event in the case that the pattern is determined to be a drag event.

Optionally, the object is a finger.

Optionally, the pattern of signals includes outputs from a plurality of conductive lines of the digitizer sensor arranged in a grid.

Optionally, the outputs from the digitizer sensor are outputs form differential amplifiers of the digitizer sensor.

Optionally, the outputs from the digitizer sensor are outputs from sensor junctions.

Optionally, the pattern of signals forms a two dimensional image.

Optionally, the pattern of signals forms a one dimensional image on each axis of the digitizer sensor.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
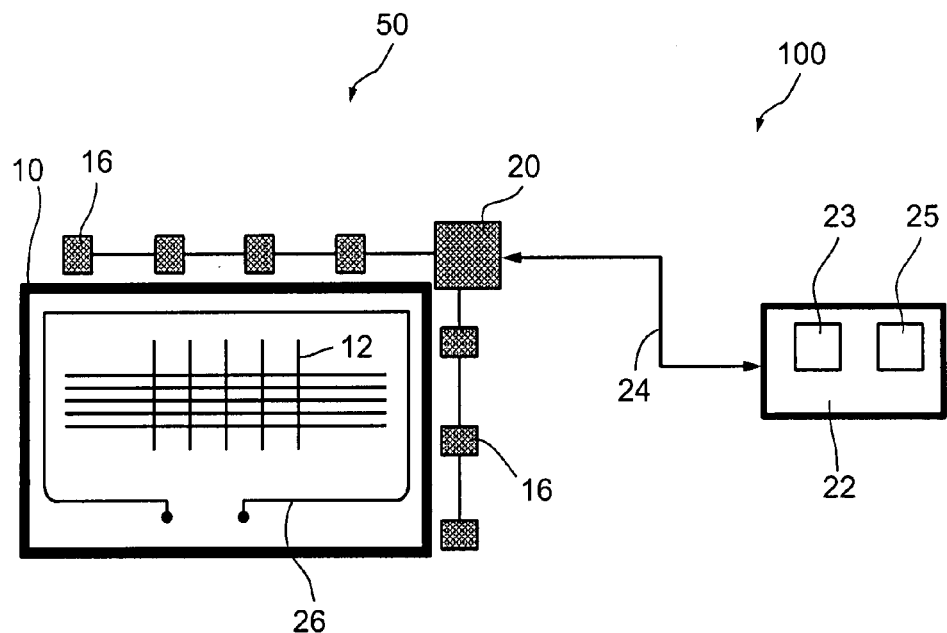
FIG. 1 is a simplified block diagram of a digitizer system according to an exemplary embodiment of the present invention.

The present invention, in some embodiments thereof, relates to capacitive touch digitizing tablet systems and more particularly, but not exclusively, to calibration of capacitive touch digitizing tablet systems.

An aspect of some embodiments of the present invention is the provision of systems and methods for periodically, continuously, substantially continuously and/or repeatedly detecting offsets of a capacitive digitizer system based on repetition patterns in the system output occurring during user interaction and zeroing out the detected offsets in the digitizer outputs responsive to the detected offsets.

According to some embodiments of the present invention, the offsets are sampled output readings of the digitizer sensor obtained between events of user interaction with the digitizer, e.g. while an object used for user interaction is lifted off the sensor. For example, during user interaction with the digitizer system, a user will typically repeatedly touch and lift the object, e.g. the finger or physical object, from the digitizer sensor for interaction with the computing device. The period over which the object engages the digitizer sensor may be referred to as a touch event while a period over which the object is removed and/or lifted off the digitizer sensor may be referred to as a remove event and/or a lift event. As used herein the term "lift event" includes periods during which there is no touch event, even if said periods are not connected with touch events, i.e., no touch events. According to embodiments of the present invention, offset values of the digitizer system may be depicted during a lift event, when an object does not invoke a signal output on the digitizer sensor.

According to some embodiments of the present invention, the system includes a zero-state detector configured for detecting sampled output that corresponds to a lift event. In some exemplary embodiments of the present invention, one sampled output per event is examined and/or an average of plurality of sampled outputs per event may be examined.

According to some embodiments of the present invention, a sampled output is determined to correspond to a lift event when that sampled output is found to repeat itself over time, e.g. over a few lift events. The present Inventors have found that correspondence between patterns and values of sampled output during lift events is much higher than correspondence between patterns and values of sampled output during touch events. The present inventors have found that this is true even for cases when the user attempts to repeatedly place an object in the same location since it is difficult for a user to place an object in exactly the sample place and in the same orientation so as to produce a repetitive output.

According to some embodiments of the present invention, the sampled output includes outputs from a grid of conductive lines. As used herein the term image and/or pattern of signals refers to sampled output from a grid of conductive lines within a defined frequency corresponding to a frequency output of an object used for user interaction. In some exemplary embodiments, the pattern of signals is a sampled spatial output after performing Discrete Fourier Transform (DFT) to outputs from a grid of conductive lines to select signals in a defined frequency range. In some exemplary embodiments, repetitive pattern of signals include pattern of signals having repetitive values in all the conductive lines. In some exemplary embodiments, repetition may be based on pre-defined repetition threshold values. In some exemplary embodiments repetitive outputs and/or pattern of signals include sample outputs having repetitive patterns. In some exemplary embodiments repetition may be based on cross correlation values between different patterns of signals.

According to some embodiments of the present invention, the zero-state detector is configured to detect images and/or pattern of signals that corresponds to an object that is dragged over the digitizer surface, e.g. a drag event and to classify that event as a candidate touch event and exclude it.

In some exemplary embodiments of the present invention, initial and/or default offset values for each of the lines in the conductive grid are determined prior to the onset of user interaction, e.g. by manual calibration, and/or by initiation of the user and are saved in non-volatile memory. Initial offset values stored in memory may be compared to offset values detected automatically, and the initial offset values may be updated and/or verified during the course of user interaction with the digitizer system.

According some embodiments of the present invention the system includes a compensator for zeroing out the update and/or verified offsets from sampled outputs.

Referring now to the drawings, FIG. 1 illustrates an exemplary simplified block diagram of a digitizer system in accordance with some embodiments of the present invention. The digitizer system 100 shown in FIG. 1 may be suitable for any computing device that enables interactions between a user and the device, e.g. mobile computing devices that include, for example, FPD screens. Examples of such devices include Tablet PCs, pen enabled lap-top computers, PDAs or any hand held devices such as palm pilots and mobile phones. According to some embodiments of the present invention, the digitizer system comprises a sensor 12 including a patterned arrangement of conducting lines, which is optionally transparent, and which is typically overlaid on a FPD 10. Typically sensor 12 is a grid based sensor including horizontal and vertical conducting lines.

According to some embodiments of the present invention, an ASIC 16 comprises circuitry to process and sample the sensor's output into a digital representation. The digital output signal is forwarded to a digital unit 20, e.g. digital ASIC unit, for further digital processing. According to some embodiments of the present invention, digital unit 20 together with ASIC 16 serves as the controller of the digitizer system and/or has functionality of a controller and/or processor. The outcome, once determined, is forwarded to a host 22 via an interface 24 for processing by the operating system or any current application. According to some embodiments of the present invention, control and/or processing functionality is additionally or exclusively included in the host 22. ASIC 16 and digital unit 20 may be provided as a single ASIC. According to some embodiments of the present invention, digital unit 20 together with ASIC 16 include memory and/or memory capability. Memory capability may include volatile and/or non-volatile memory, e.g. FLASH memory. In some embodiments of the present invention, the memory unit and/or memory capability, e.g. FLASH memory is a unit separate from the digital unit 20 but in communication with digital unit 20.

According to some embodiments of the present invention, sensor 12 comprises a grid of conductive lines made of conductive materials, optionally Indium Tin Oxide (ITO), patterned on a foil or glass substrate. The conductive lines and the foil are optionally transparent. Typically, the grid is made of two layers, which are electrically separated from each other. Typically, one of the layers contains a set of equally spaced parallel conductors and the other layer contains a set of equally spaced parallel conductors orthogonal to the set of the first layer. Typically, the parallel conductors are equally spaced straight lines, and are input to amplifiers included in ASIC 16. Optionally the amplifiers are differential amplifiers. Typically, the parallel conductors are spaced at a distance of approximately 2-8 mm, e.g. 4 mm, optionally depending on the size of the FPD and a desired resolution. Optionally the region between the grid lines is filled with a non-conducting material having optical characteristics similar to the conducting lines, to mask the presence of the conducting lines. Preferably, the ends of the lines remote from the amplifiers are not connected so that the lines do not form loops.

Typically, ASIC 16 is connected to outputs of the various conductors in the grid and functions to process the received signals at a first processing stage. As indicated above, ASIC 16 typically includes an array of amplifiers, e.g. differential amplifiers, to amplify the sensor's signals. Additionally, ASIC 16 optionally includes one or more filters to remove frequencies that do not correspond to frequency ranges used for excitation and/or obtained from objects used for user interactions. Optionally, filtering is performed prior to sampling. The signal is then sampled by an A/D, optionally filtered by a digital filter and forwarded to digital ASIC unit, for further digital processing. Alternatively, the optional filtering is fully digital or fully analog.

According to some embodiments of the invention, digital unit 20 receives the sampled data from ASIC 16, reads the sampled data, processes it and determines and/or tracks the position of physical objects, such as stylus, and/or finger, touching the digitizer sensor. According to some embodiments of the present invention, digital unit 20 determines the presence and/or absence of physical objects, such as stylus, and/or finger over time. In some exemplary embodiments of the present invention hovering of an object, e.g. stylus, finger and hand, is also detected and processed by digital unit 20. Calculated position is sent to the host computer via interface 24.

According to some embodiments, digital unit 20 produces and manages a triggering pulse to be provided to an excitation coil 26 that surrounds the sensor arrangement and the display screen. The excitation coil provides a trigger pulse (in the form of an electric or electromagnetic field) that excites passive circuitry in a stylus or other object used for user interaction to produce a response from the stylus that can subsequently be detected.

According to some embodiments, digital unit 20 produces and sends a triggering pulse to at least one of the conductive lines. According to some embodiments of the present invention, the triggering pulse and/or signal implemented may be confined to one or more pre-defined frequencies, e.g. 18 KHz.

According to some embodiments of the invention, host 22 includes at least a memory unit 23 and a processing unit 25 to store and process information obtained from ASIC 16. Memory and processing capability is also generally included in digital unit 20 and ASIC 16. According to some embodiments of the present invention memory and processing functionality may be divided between any two or three of host 22, digital unit 20, and ASIC 16 or may reside in only one of them and/or may be a separated unit connected to at least one of host 22, digital unit 20, and ASIC 16. According to some embodiments of the present invention, one or more tables and/or databases may be stored to record one or more outputs, e.g. images or patterned outputs of sensor 12, sampled by ASIC 16 and/or digitizer unit 20. In some exemplary embodiments, a database of sampled output signals may be stored. Data and/or signal values may be stored in volatile and non-volatile memory. According to some embodiments of the present invention, data and/or signal values may be stored as tables of spatial output of the digitizer sensor and/or differential amplifier output of the digitizer sensor. According to some embodiments of the present invention outputs are recorded after, e.g. after low pass and/or band-pass filtering to select outputs from frequency ranges corresponding outputs from objects used for user interaction, e.g. outputs from a frequency range corresponding to finger detection.

According to some embodiments of the present invention the digitizer system may include one or more digitizers associated with a single host 22. In some exemplary embodiments the digitizer 50 includes at least the digitizer sensor 12, ASIC units 16 and digital unit 20.

Digitizer systems used to detect stylus and/or finger tip location may be, for example, similar to digitizer systems described in incorporated U.S. Pat. No. 6,690,156, U.S. Patent Application Publication No.. 7,292,229 and/or U.S. Patent Application Publication No. 20040155871. It will also be applicable to other digitized systems known in the art, depending on their construction.

Figure 2:
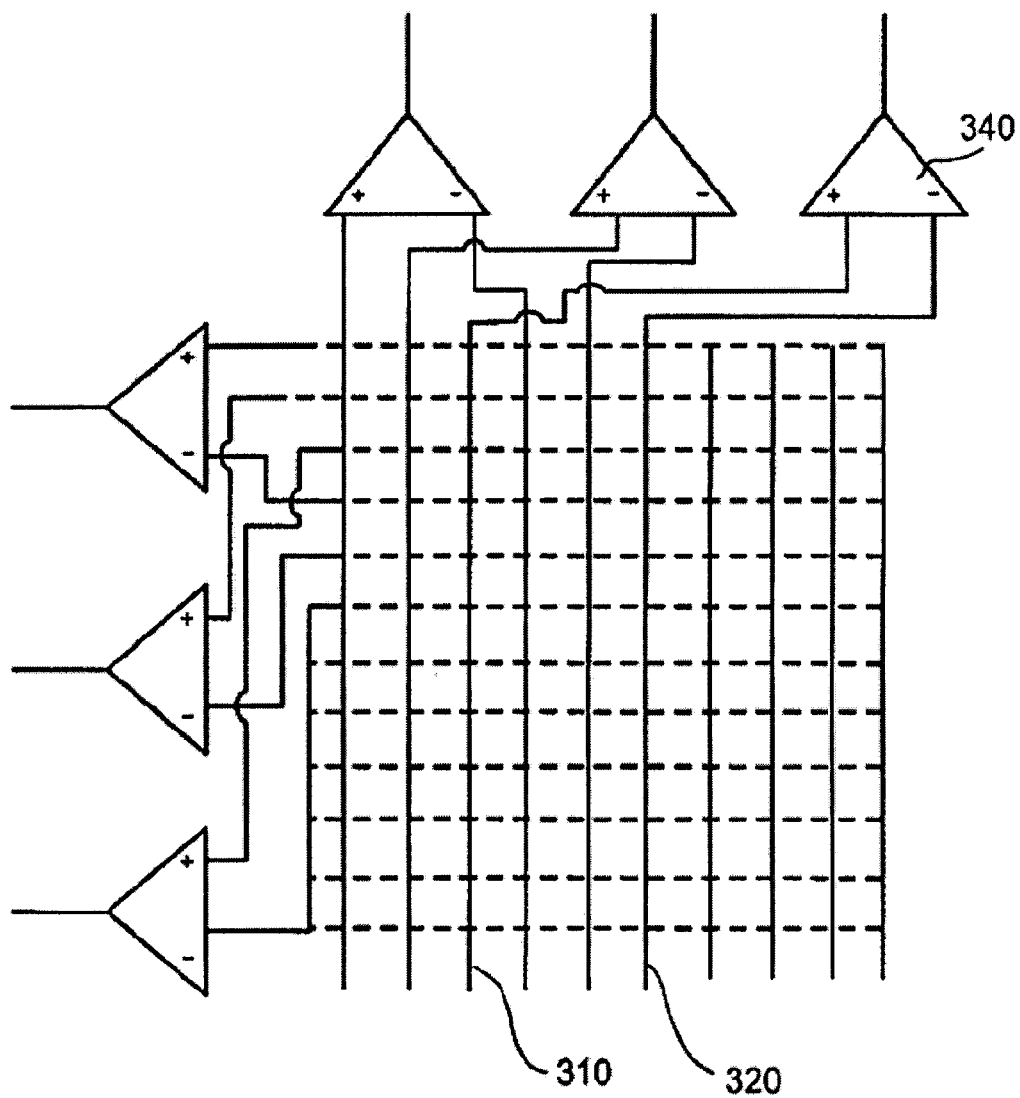
FIG. 2 is an exemplary circuit diagram describing touch detection, in accordance with some embodiments of the invention.

Reference is now made to FIG. 2 showing an array of conductive lines of digitizer sensor 12 as input to differential amplifiers according to embodiments of the present invention. Conductive lines 310 and 320 are parallel non-adjacent lines of sensor 12. According to some embodiments of the present invention, conductive lines 310 and 320 are interrogated to determine if there is a finger input signal derived from finger touch and/or finger hovering. Separation between the two conductive lines 310 and 320 is typically greater than the width of the finger, e.g. a finger width of approximately 12 mm, so that the necessary potential difference can be formed. Typically a finger touch on the sensor may span 2-8 lines, e.g. 6 conductive lines and the distance between the lines may span between 1-6 mm. Typically, the finger hovers over and/or touches the digitizer over a number of conductive lines so as to generate an output signal in more than one differential amplifier, e.g. a plurality of differential amplifier's. However, a finger touch may be detected when placed over one conductive line. The differential amplifier 340 amplifies the potential difference developed between conductive lines 310 and 320. ASIC 16 and digital unit 20 process the amplified signal and determine the location and/or position of the user's finger based on the amplitude and/or signal level of the sensed signal.

Figure 3:
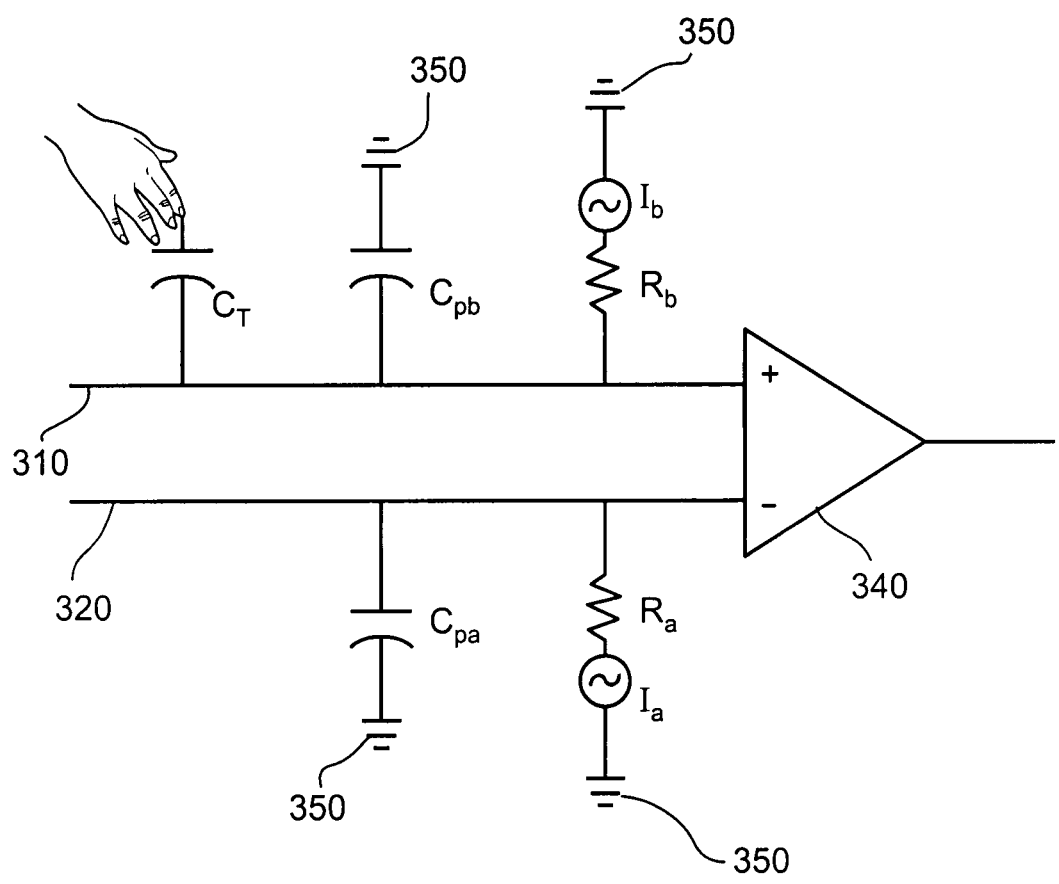
FIG. 3 is an exemplary circuit diagram of two conductive lines of a digitizer that are input to a differential amplifier according to some embodiments of the present invention.

Reference is now made to FIG. 3 showing an exemplary circuit diagram for touch detection according to some embodiments of the present invention. According to some embodiments of the present invention, conductive lines 310 and 320 are interrogated to determine if there is a finger input signal derived from finger touch and/or finger hovering. To query the pair, one or more signal sources, e.g. an AC signal sources $I_a$ and $I_b$ (connected to conductive lines 320 and 310 via resistances and/or impedances $R_b$ and $R_a$ respectfully), induce an oscillating signal in conductive lines 320 and 310 of sensor 12. All signals are referenced to a common ground 350. When a finger is placed on one of the conductive lines of the pair, a capacitance, $C_T$, develops between the finger and conductive line 310. As there is a potential between the conductive line 310 and the user's finger, current passes from the conductive line 310 through the finger to ground. Typically, parasitic capacitance $C_{pb}$ and $C_{pa}$ are also present on lines 310 and 320 due to the presence of surrounding electronic components, e.g. the display screen (for example, caused by different distances of the lines from the screen). Consequently a potential difference is created between conductive line 310 and its pair 320, both of which serve as input to differential amplifier 340. The differential amplifier 340 amplifies the potential difference developed between conductive lines 310 and 320 and ASIC 16 and digital unit 20 processes the amplified signal and thereby determines the location of the user's finger. According to some embodiments, digital processing unit 20 is operative to control an AC signal provided to conductive lines of sensor 12, e.g. conductive lines 310 and 320. Finger touch detection is described with further details in, for example incorporated US Patent Application Publication 20040155871.

According to some embodiments of the present invention, another method for finger touch detection may be implemented. According to embodiments of the present invention, at each junction in sensor 12 a certain minimal amount of capacitance exists between orthogonal conductive lines. In an exemplary embodiment, an AC signal is applied to one or more parallel conductive lines in the two-dimensional sensor matrix 12. When a finger touches the sensor at a certain position where the AC signal is induced, the capacitance between the conductive line through which the AC signal is applied and the corresponding orthogonal conductive lines at least proximal to the touch position increases and the AC signal crosses by virtue of the capacitance of the finger to corresponding orthogonal conductive lines to produce and an output signal on that orthogonal conductive line. This method is able to detect more than one finger touch at the same time (multi-touch). This method further enables calculating touch area. In exemplary embodiments of the present invention, each conductive line is input to an amplifier. Optionally, each line is input to a differential amplifier, while the other input to the amplifier is ground. Typically, the presence of a finger decreases the coupled signal by 20-30% since the finger typically drains current from the lines. Methods for multi-touch is further described in US Patent Application No. 20070285404, entitled "Fingertip touch recognition for a digitizer", which is hereby incorporated by reference in its entirety and in incorporated U.S. Patent Application Publication No. 20040155871.

In one example, the origin of the user's finger from the two inputs of the differential amplifier is determined by examining the phase of the output. In another example, since a finger touch typically produces output in more than one conductive line, the origin of the user's finger from the two inputs of the differential amplifier is determined by examining outputs of neighboring amplifiers and optionally interpolation is used to find a more accurate value. In yet other examples, a combination of both methods may be implemented.

Typically parasitic capacitance induces an AC current leakage into the conductive lines of the digitizer referred to as a offset signals, background signals and/or steady state signals. In an ideal environment, the parasitic capacitance and therefore the offset signal level in each of the lines are expected to be identical. However, in practice slight differences in distance between the digitizer and screen, material structure in specific areas of the digitizer screen, environmental conditions and parasitic capacitance on associated PCB, may affect the parasitic capacitance level between the screen and some of the lines.

The unbalanced capacitance creates an unbalance offset signal level of the lines that may subsequently be amplified by the differential amplifier 340. The present Inventors have found that the offset signal may reduce the level of accuracy possible in location detection and may result in mistakenly detecting a touch event when no finger is placed on the digitizer sensor.

According to some embodiments of the present invention, a differential map may be determined and used to compensate for the offset signal phenomenon. According to embodiments of the present invention, a differential map is determined for a pre-defined range of frequencies corresponding to the frequency range expected to result from the object used for user interaction. Offset levels for each of the conductive lines once determined may be subtracted from a detected signal to obtain a touch signal created by a user finger. Offset levels and/or patterns may change over time and/or during use and the map may require updating. Typically, in known systems using a mapping solution, a map of offset signal is calculated during a dedicated initialization procedure and/or each time there is doubt regarding the validity of the map. During such procedures the user is typically requested, e.g. by a caption on the display screen, to remove his/her hand from the display screen while an updated map is calculated. Since the map may require updating during the course of user interaction with the digitizer system, such a procedure may pose an inconvenience to user.

Figure 4:
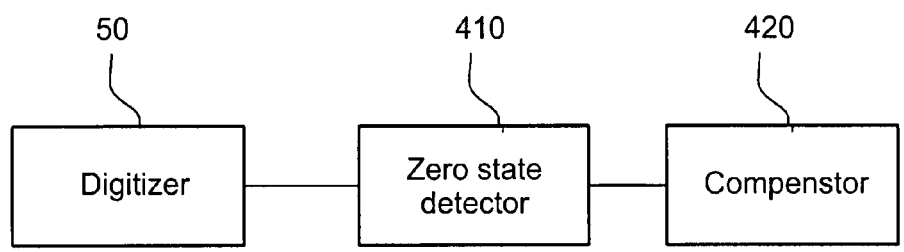
FIG. 4 is a simplified block diagram of a digitizer system including real time calibration capability according to some embodiments of the present invention.

Reference is now made to FIG. 4 showing a simplified block diagram of a digitizer system including real time calibration/compensation capability according to some embodiments of the present invention. According to some embodiments of the present invention, the digitizer system includes digitizer 50 for sensing touch, e.g. finger touch, a zero-state detector 410 for detecting a period of time when an object is lifted away from the digitizer 50 and for recording offset levels during such a period, and a compensator 420 for subtracting detected offset values from detected signals to obtain a touch signal created by a user's finger. According to some embodiments of the present invention, zero-state detector 410 and/or compensator 420 and/or their functionality may be embedded and or integrated in digital unit 20.

According to some embodiments of the present invention, zero-state detector 410 records patterns of signals of the digitizer (distributions of lift or no-touch signal values over the surface) during periods when no user input is present on digitizer 50 and determines digitizer background signal levels and/or offsets values, e.g. a map of digitizer offsets, based on the detected output. According to some embodiments of the present invention, zero-state detector 410 detects digitizer offsets and/or steady state signal levels in real time, while a user is interacting with the digitizer, e.g. between periods of user interaction. For example, during user interaction with the digitizer, a user may touch the digitizer sensor with a finger, lift that finger and then touch the digitizer again. A period during which an object produces signals on the digitizer may be defined as a touch event. A period over which an object is lifted off the digitizer, such that no signal from the object is invoked, may be defined as a lift event. Typically, during user interaction with the digitizer, a series of touch and lift events occur in succession.

According to some embodiments of the present invention, zero-state detector 410 may be implemented to distinguish between lift and touch events and record pattern of signals from lift events that may be used to calibrate the digitizer output. Offset readings may be updated periodically and/or substantially continuously during user interaction with digitizer 50 without interrupting user interaction with the digitizer system.

According to embodiments of the present invention, patterns of signals that are approved as zero-state images are used by compensator 420 to zero out offsets. According to embodiments of the present invention, zeroing is performed digitally after the detected output undergoes filtering to select a frequency range of the output signal that corresponds to the frequency used to detect object for user interaction. In some exemplary embodiments, outputs from the differential amplifiers undergo DFT to select a frequency range originating from figure touch and then offsets are subtracted from the filtered signal in the time domain. According to embodiments of the present invention determined offset values are offset values in the time domain obtained from the selected frequency range.

Figure 5:
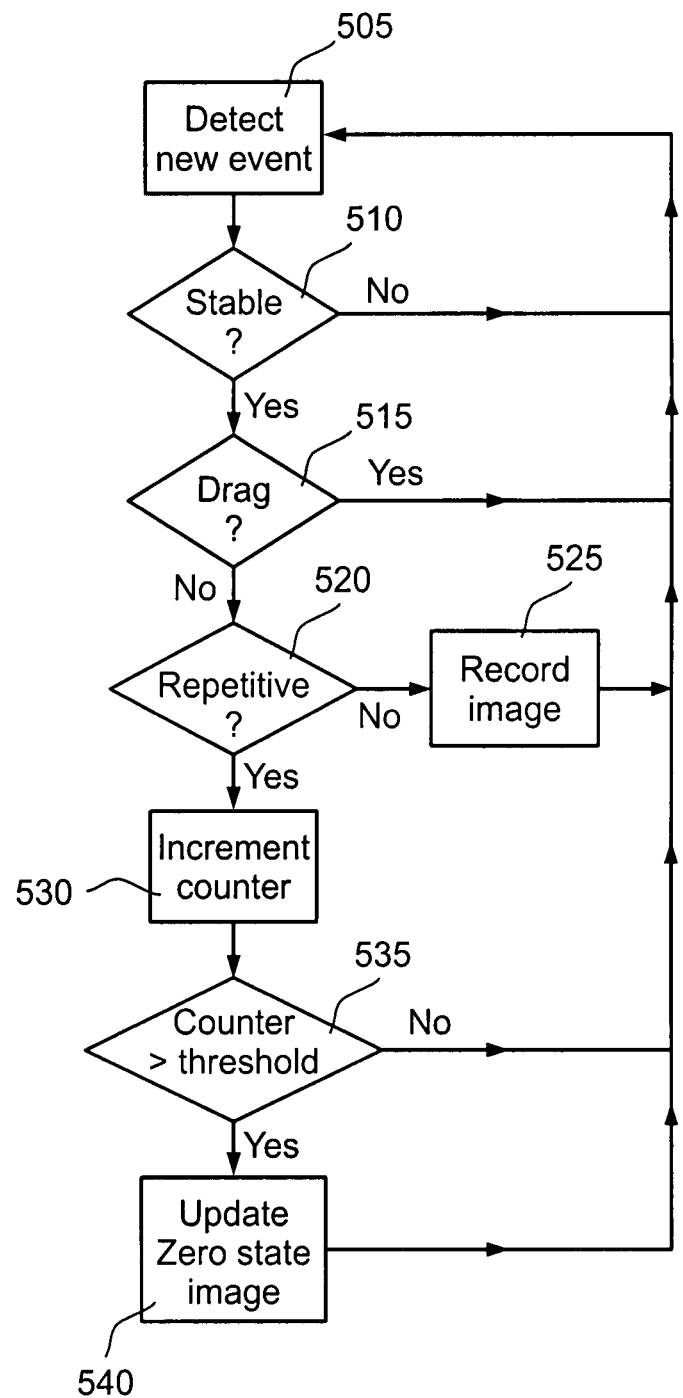
FIG. 5 is an exemplary flow chart of a method for zero-state detecting according to some embodiments of the present invention.

Reference is now made to FIG. 5 which shows an exemplary flow chart of a method for zero-state detecting according to some embodiments of the present invention. According to some embodiments of the present invention, during user interaction with the digitizer system, zero-state detector 410 searches for an onset of a new event (block 505). In some exemplary embodiments of the present invention, a new event is determined when a sudden and/or significant change in a signal pattern image in reference to a previous signal pattern is determined. Optionally an event threshold is defined in order to identify an onset of a new event. In some exemplary embodiments, a change in an event is defined when a reading from at least one conductive line changes in reference to a previous reading of that line by a magnitude above the defined threshold. In some exemplary embodiments, reading from more than one conductive line must change in reference to a previous reading of those lines by a magnitude above the defined threshold.

According to embodiments of the present invention, a new event is checked for stability (block 510). In some exemplary embodiments, sensor outputs that are consistent over a pre-defined number samples are considered stable and may be considered for further processing to determine if that event may correspond to a lift event. Events that do not meet the stability requirement are typically ignored for calibration purposes.

During user interaction with the digitizer, a user performs a "drag" user interaction, e.g. a move a finger across the digitizer sensor. A period over which a user drags an object used for user interaction is defined as a drag event. A drag event may be mistakenly considered as a series of new events, since the pattern of signal may significantly change as the finger moves along the screen. According to embodiments of the present invention, zero-state detector is implemented to identify drag events and weed them out as potential new events and/or potential lift events (block 515). Methods for identifying drag events according to some embodiments of the present invention will be further described herein.

According to embodiments of the present invention, an identified new event may be analyzed to determine if the event qualifies as a lift event. Pattern of signals from lift events are implemented to define a zero-state of the system. Identification of lifts events is based on a finding by the present inventors that pattern of signals of different lift events tend to be repetitive while pattern of signals of different touch events seldom repeat themselves. According to embodiments of the present invention, a signal pattern of an identified event is compared to pattern of signals recorded from previous events. If the signal pattern and/or image is found to be repetitive (block 520) an image counter for that pattern is incremented (block 530). If the image is not similar to previous images and/or if no prior signal patterns have been recorded, the current image is recorded (block 525) so that it may be compared to subsequent images detected. Images that are found to repeat themselves over a predefined number of times (535) are implemented to define and/or update offset values that may be used to compensate for offset signals (block 540). According to embodiments of the present invention, offset values may be updated as required based on new detected events and images recorded throughout user interaction with the digitizer system.

Figure 6:
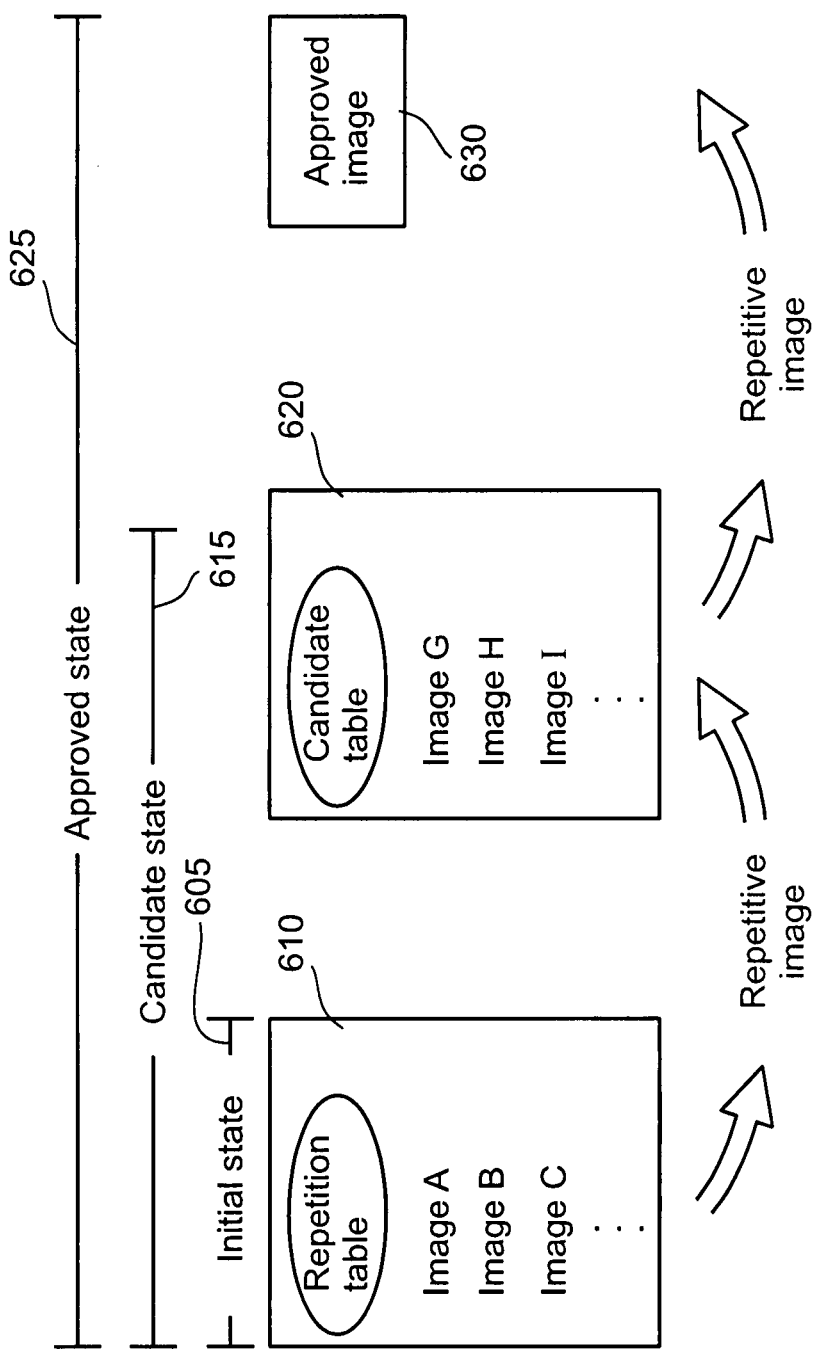
FIG. 6 is a simplified block diagram describing three states of a zero-state detector according to some embodiments of the present invention.

Reference is now made to FIG. 6 which shows a simplified block diagram describing three possible states and/or modes of the zero-state detector according to embodiments of the present invention. According to some embodiments of the present invention, the zero-state detector may operate under an initial state 605 upon power-up and/or wake-up of the system, a candidate state 615, upon identification of one or more potential zero-state images, and/or an approved state 625 upon selection of an approved zero-state image for defining system offsets. Typically, during all three states a repetition table 610 is implemented to record images corresponding to new events. The zero-state detector switches to a candidate state when at least one of the images from repetition table 610 is repeated and stores the repeated image(s) in a candidate table 620.

During a candidate state images from new events are compared to images of earlier events stored in candidate table 620. When a predetermined number of repetitions of a candidate image is found, that candidate image is selected as an approved zero-state image 630 and zero-state detector switches to an approved state 625. Approved zero-state image 630 is an image approved for defining the current offset of the digitizer system, e.g. is used for calibration.

During approved state 625, images from new events are compared to the zero-state image 630 to determine if updating of the zero-state image is required. Images from new events that are found to differ significantly from zero-state image 630 may be stored in repetition table 610 if not already appearing there or in candidate table 620 if a repetition of that image was found. If new candidate images are detected, the approved zero-state image is saved in the candidate table 620, and zero-state detector reverts back to candidate state 615 to reassess the approved zero-state image. According to embodiments of the present invention, during an approved state, repetitive images are still detected and added to the candidate table.

Figure 7:
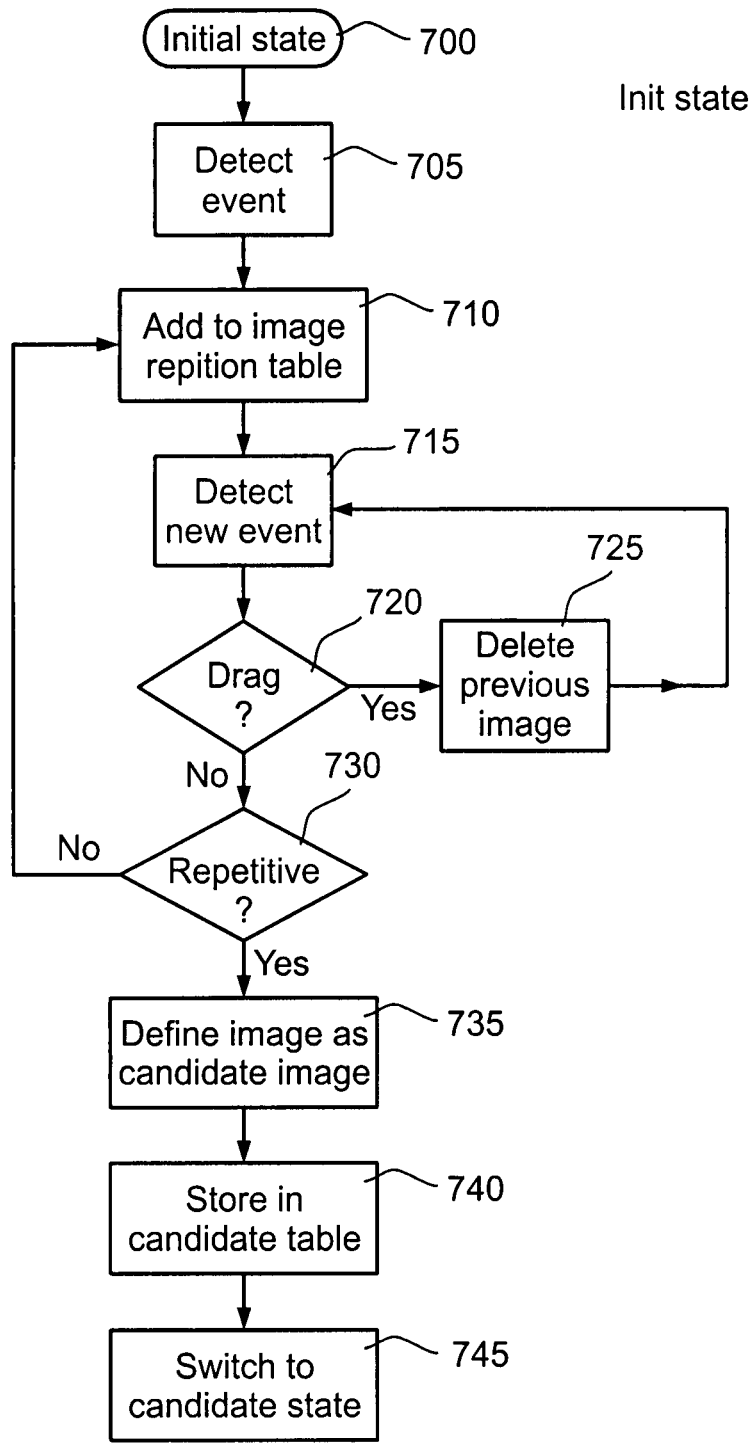
FIG. 7 is an exemplary flow chart of a method for determining candidate pattern of signals during an initial state of a zero-state detector according to some embodiments of the present invention.

Reference is now made to FIG. 7 showing an exemplary flow chart of a method for determining candidate images during an initial state of a zero-state detector according to some embodiments of the present invention. According to some exemplary embodiments of the present invention, the initialization state 700 is initiated upon a wake-up and/or power-up of the digitizer system. Typically at an onset of an initialization state the repetition table is empty. According to embodiments of the present invention, an image is detected (block 705) at power-up and added to the repetition table (block 710). Subsequently new events are detected (block 715) and corresponding images are compared to the stored image in the repetition table.

According to some embodiments of the present invention, a new event is defined and/or detected when a sudden and/or significant change in an image in reference to a previous image is determined. Optionally, the small changes in the image pattern and/or magnitude, which are under the predefined threshold are tracked in order to avoid a situation when several small changes will eventually lead to the image passing this threshold, and this change will be mistakenly referred to as a new event.

In some exemplary embodiments, only stable events are implemented to determine zero-state images. A pre-defined threshold may be implemented to define the period and/or the number of cycles over which the digitizer sensor samples consistent output, for the event to be considered a stable event.

A new detected event is analyzed to determine if the new event is a result of a drag event (block 720). If a drag event is detected, the image previously stored in the repetition table is deleted (block 725) as it most likely corresponds to the onset of the drag event and the drag event is ignored. If the new event is not identified as drag event, an image corresponding to the new event is compared to images stored in the repetition table (block 730). If no match is found, the new image is added to the repetition table (block 710) and a new event is sought. According to some embodiments of the present invention, for cases when repetition is detected, the repeated image is defined as a candidate image (block 740) and the zero-state detector switches from the initial state to a candidate state (block 745). In some exemplary embodiments, after one repetition of an image stored in the repetition table, the image is defined as a candidate image. In other exemplary embodiments, an image stored in the repetition table must be repeated a pre-defined number of times within a given period prior to being defined as a candidate image.

Figure 8:
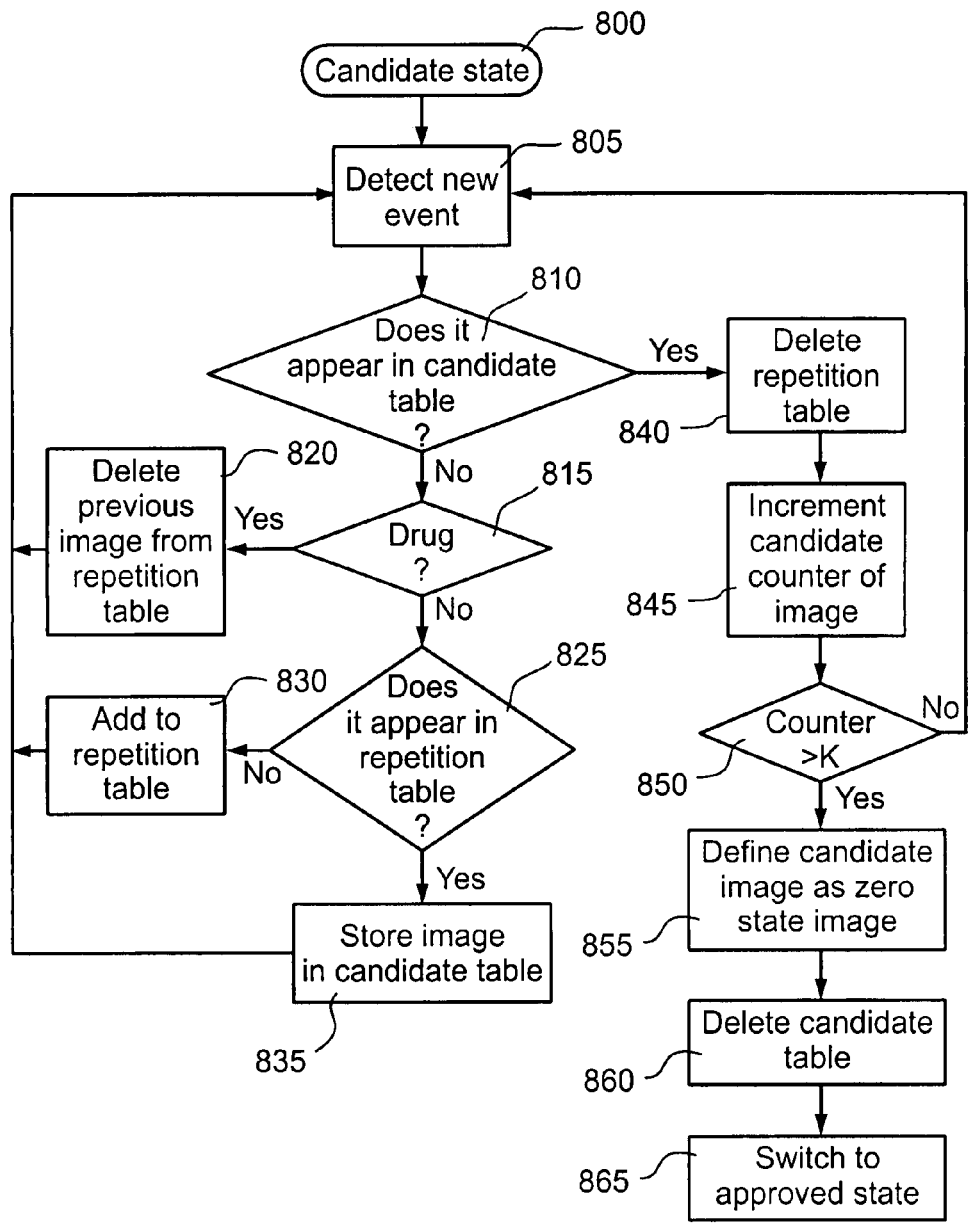
FIG. 8 is an exemplary flow chart of a method for determining an approved zero-state image during a candidate state of a zero-state detector according to some embodiments of the present invention.

Reference is now made to FIG. 8 showing an exemplary flow chart of a method for determining an approved zero-state image during a candidate state of a zero-state detector according to some embodiments of the present invention. According to some exemplary embodiments of the present invention, the candidate state 800 is initiated upon detection of a candidate image. During the candidate state images corresponding to new events detected by zero-state detector (block 805) are compared to candidate images stored in the candidate table (block 810). Images that are not found in the candidate table are analyzed to determine if the new event is a result of a drag event (block 815). If a drag event is detected, the image previously stored in the repetition table is deleted (block 820) as it most likely corresponds to the onset of the drag event and the drag event is ignored. If a drag event is not identified, an image corresponding to the new event is compared to images stored in the repetition table (block 825). If no match is found the new image is added to the repetition table (block 830) and a new event is sought. If a repetition is found, the repetitive image is defined as a candidate image and is stored in the candidate table (block 835) and a new event is sought.

According to some embodiments of the present invention, in cases when the new event does appear in the candidate table, the contents of the repetition table is deleted (block 840) and a candidate counter corresponding to the repeated image is incremented (block 845). The candidate counter is implemented to count the number of repetitions for each candidate image. After incrementing the counter, if the value of the candidate counter checked (block 850). If the candidate counter is less than a predefined threshold k, zero-state detector continues to detect new events. If the candidate counter crosses the threshold the corresponding candidate image is approved as a zero-state image (block 855), the current candidate table is deleted (block 860) and the zero-state detector switches to an approved state (block 865).

In one exemplary embodiment the threshold ('k') is set to 3. Other threshold values may be used. In some exemplary embodiments, the threshold value may be increased to improve the likelihood that the approved zero-state image corresponds to a true map of the system offsets.

In some exemplary embodiments the approved zero-state image is stored in non-volatile memory. In some exemplary embodiments the approved zero-state image is stored in FLASH memory.

Figure 9:
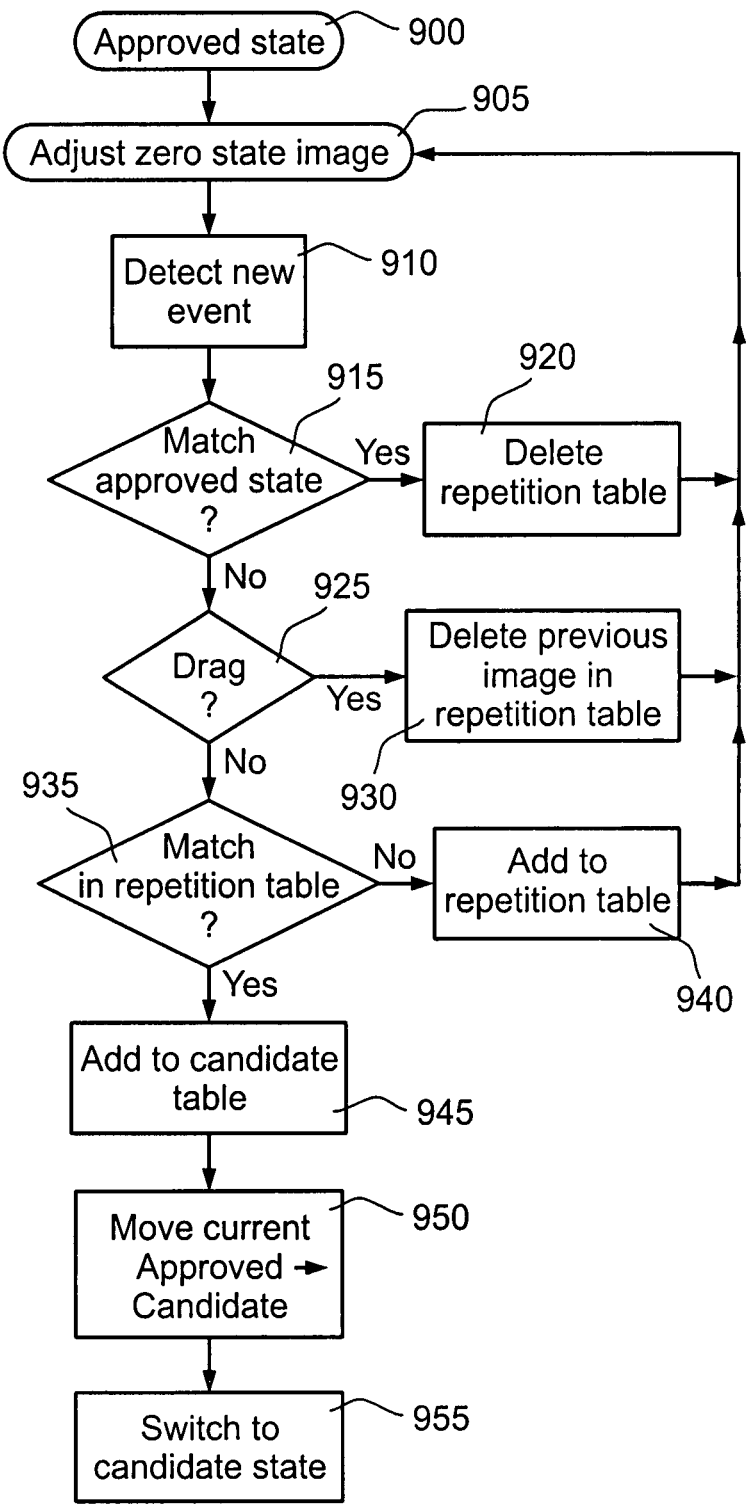
FIG. 9 is an exemplary flow chart of a method for verifying and/or updating an approved zero-state image during an approved state of a zero-state detector according to some embodiments of the present invention.

Reference is now made to FIG. 9 showing an exemplary flow chart of a method for verifying and/or updating an approved zero-state image during an approved state of a zero-state detector according to some embodiments of the present invention. According to some embodiments of the present invention an approved zero-state image may not correspond to true map of system offsets, e.g. may be an erroneous zero-state image, and/or the approved zero-state image may be invalidated over time due to changes in the system offset. According to embodiments of the present invention, approved zero-state images are continuously and/or periodically verified and updated. According to some embodiments of the present invention, verification is facilitated by continuously, and/or periodically checking for repetitive patterns of signals and comparing them to the zero-state image According to some exemplary embodiments of the present invention, the approved state 900 is initiated upon detection of an approved zero-state image. During the approved state the zero-state image may be adjusted to slow changes detected in sampled images prior to detection of a new event (block 905). Adjustment provides learning small changes in signals' magnitude and/or patterns, which are under a predefined threshold in order to avoid a situation when several small changes over a few sampled images may lead to the threshold being crossed and a new event being defined. Optionally, the approved zero-state is adjusted using weighted average or simple average on the detected images over time. In some exemplary embodiments, weighted averaging may give more weight to the pattern of signals that is stored.

Upon detection of a new event (block 910), an image corresponding to the new event is compared to the current zero-state image. If the new event matches the zero-state image, the repetition table is deleted and/or initialized (block 920). If the new event doesn't match the zero-state image, it is analyzed to determine if the new event is a result of a drag event (block 925). If a drag event is detected, the image previously stored in the repetition table is deleted (block 930) as it most likely corresponds to the onset of the drag event and the drag event is ignored. If a drag event is not identified, an image corresponding to the new event is compared to images stored in the repetition table (block 935). If no match is found, the new image is added to the repetition table (block 940) and a new event is sought. If a repetition is found, doubt arises to the validity of the current approved zero-state image. As such, the repetitive image is defined as a candidate image and is stored in the candidate table (block 945). Additionally, the current zero-state image is defined as a candidate image and stored in the candidate table (block 950). At this point the zero-state detector reverts back to the candidate state (block 955) so that the current approved state may be updated if required.

Figure 10A:
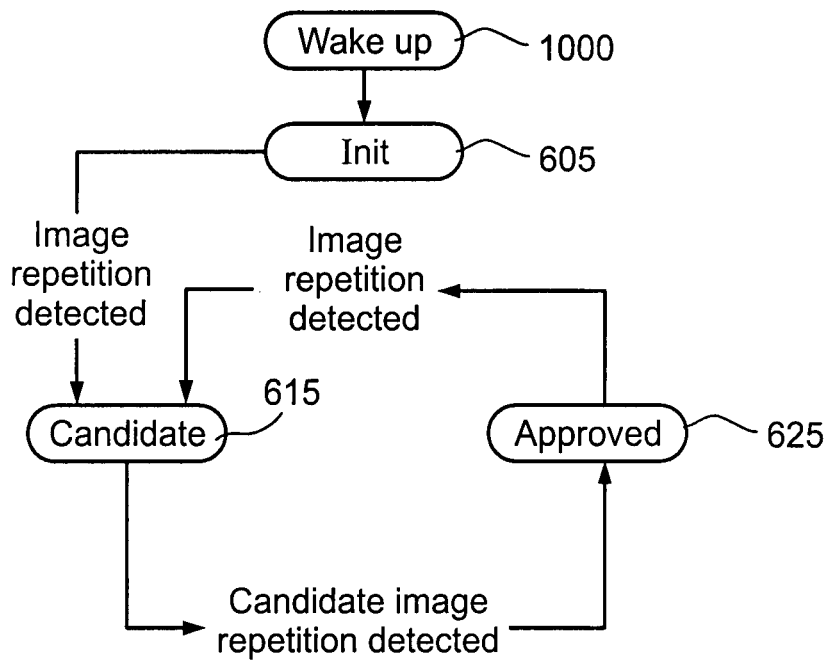
FIGS. 10A-10C are exemplary flow charts showing three methods for initiating zero-state detection upon wake-up of a digitizer system according to some embodiments of the present invention.
Figure 10B:
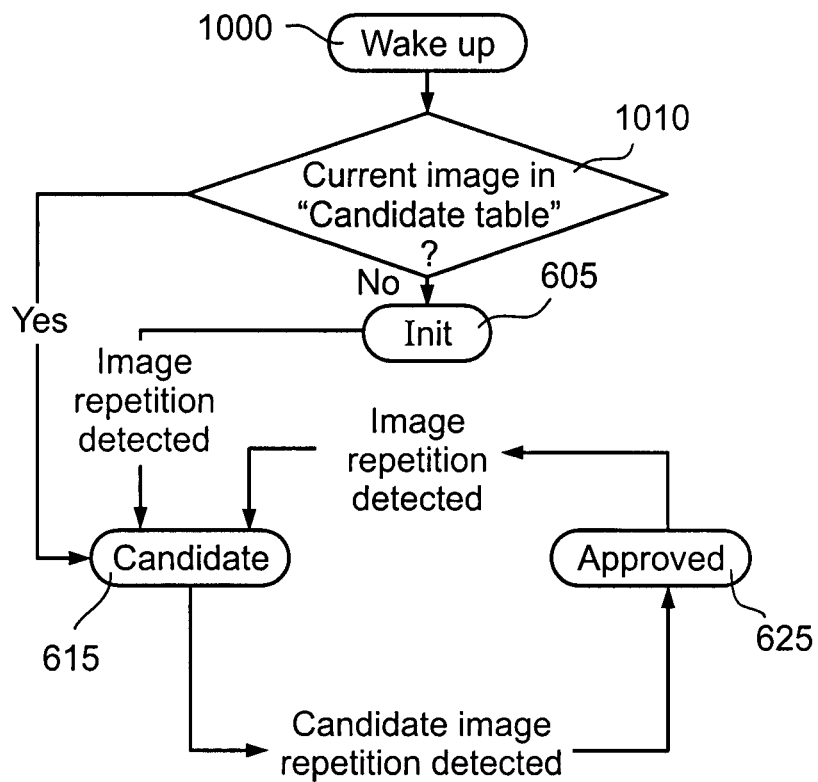
Figure 10C:
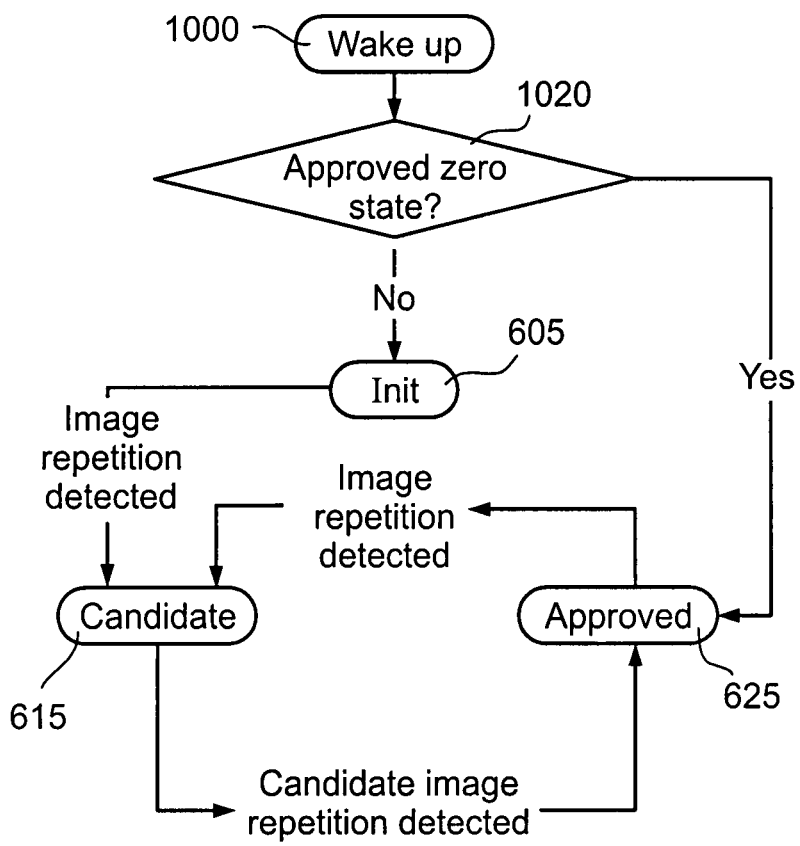

Reference is now made to FIGS. 10A-10C showing exemplary flow charts of methods for initiating zero-state detection upon wake-up of a digitizer system according to some embodiments of the present invention. In FIG. 10A an automatic calibration system is depicted that does not rely on any pre-stored offset values. According to such embodiments, upon wake-up of a digitizer sensor (1000), the zero-state detector initiates detection from an initial state 605 as described herein above. When repetitive images are detected, zero-state detector switches to a candidate state 615. When repetitive candidate images are detected, zero-state detector switches to an approved state 625. When new repetitive images are detected different than an approved zero-state image, zero-state detector reverts back to a candidate state.

In some exemplary embodiments, during a period prior to a detecting a candidate image, touch detection is not active and finger coordinates are not forwarded to the host computer so as to avoid false events. Once at least a candidate image is defined, touch detection becomes active and finger coordinates are forwarded to the host computer. In other exemplary embodiments, finger coordinates are not forwarded to the host computer until a zero-state image is defined. According to some embodiments of the present invention, default offset values are implemented prior to definition of a candidate image and/or zero-state image.

In FIG. 10B another embodiment of the present invention is described where a manual calibration is initiated in addition to the automatic calibration process described in reference to FIG. 10A. At the manual calibration process, the user is capable of initiating a manual calibration, hence to manually define a zero-state image. In some exemplary embodiments, the manual calibration is performed at the manufacturing site and the resultant zero-state image is stored in as permanent and/or semi-permanent candidate image. In some exemplary embodiments, during a manual calibration procedure, the user is requested to remove his hand from the digitizer sensor while a zero-state image is recorded. The captured image is stored as permanent candidate image, e.g. stored in non volatile memory that is not deleted along with the rest of the candidate table. Optionally, accumulated approved zero-states are also saved as zero-state candidates and are not deleted and/or are saved in non-volatile memory. According to this embodiment of the present invention, upon wake-up of the digitizer system (1000), the 'wake up' image is compared to candidate images that have been stored, e.g. permanently stored, in the candidate table, if a match is found, zero-state detector switches directly to candidate state 615. If no match is found, zero-state detector reverts back to an initial state and the methods described in reference to FIG. 10A are followed.

In FIG. 10C another embodiment of the present invention is described where an approved zero-state image is stored in long term memory. In one exemplary embodiment, the zero-state image is an image obtained from a manual calibration process. In another exemplary embodiment, the approved zero-state image is an image obtained from previous user interaction with the digitizer system, e.g. a previously approved zero-state image. According to this embodiment of the present invention, upon wake-up of the digitizer system (1000), an image corresponding to a new event is compared to an approved zero-state image, if a match is found, zero-state detector switches directly to approved state 625 and this zero-state image is used. If a match is not found, zero-state detector reverts back to the initial state 605 and methods described in reference to FIG. 10A are followed.

According to some embodiments of the present invention, a method for determining a 'drag' event in a capacitive touch sensor is provided. A drag event refers to a touch event where a user is dragging a finger and/or other object on the sensor. Drag events may be erroneously detected as a series of new events when searching for a zero-state image. According to embodiments of the present invention, drag events are identified so that they may be excluded when searching for zero-state images.

The present inventors have found that when subtracting a previous image from a current image, the resultant image, e.g. the delta pattern, may display specific characteristics and/or patterns that may be used to distinguish between drag events and other events, e.g. touch events or lift events. Specifically the present Inventors have found that delta patterns obtained during drag result in outputs with a common phase in a current position of the object and outputs with an opposite phase in a position where the finger was positioned in the previous image.

Figure 11A:
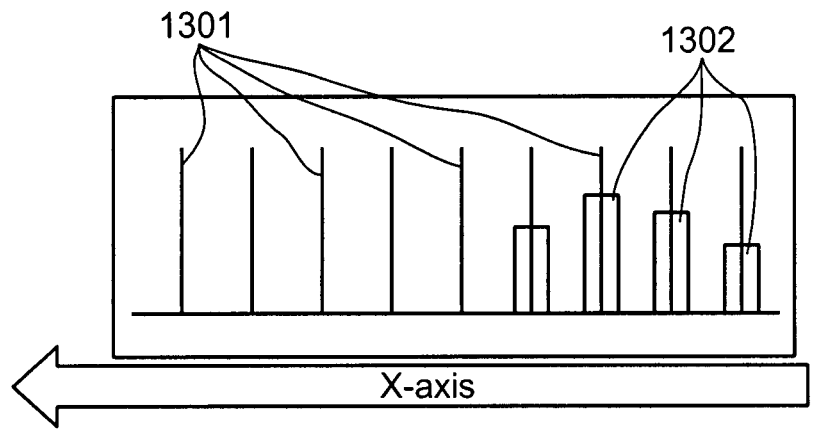
FIGS. 11A and 11B are two exemplary detected sensor readings during a drag event when a user's finger moves along an X-axis of the digitizer sensor according to some embodiments of the present invention.
Figure 11B:
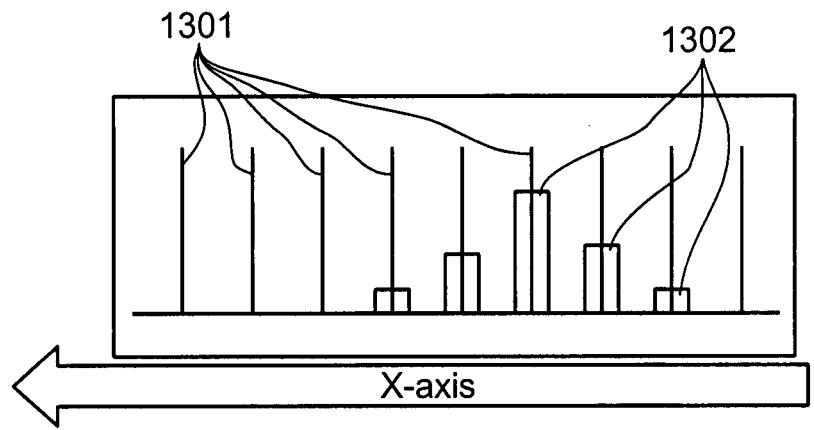

Reference is now made to FIGS. 11A and 11B showing two exemplary detected sensor readings during a drag event when a user's finger moves along an X-axis of the digitizer sensor. FIG. 11A is a previous image and FIG. 11B is a current image such that the finger is moving on the sensor in a direction parallel to an X axis of the digitizer sensor so that a change is detected only on x-axis. Amplitudes of signals detected from conductive lines 1301 are displayed as histograms 1302. As the finger is dragged towards the left, outputs of conductive lines 1301 are also shifted toward the left.

Figure 11C:
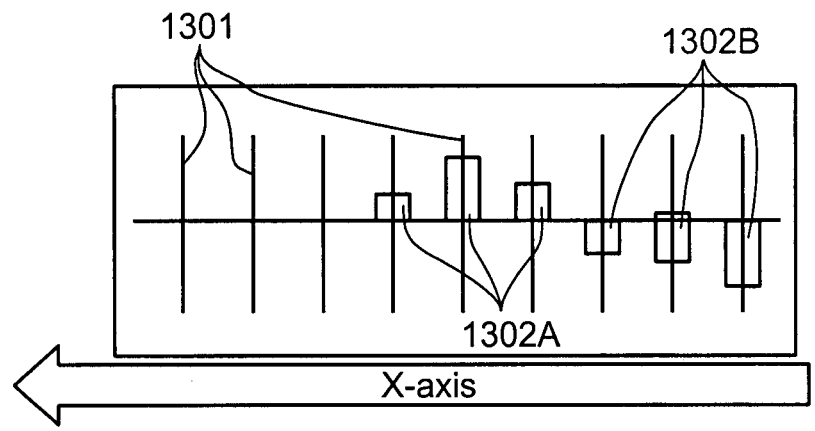
FIG. 11C is a result of subtracting the two exemplary detected sensor readings in FIGS. 11A and 11B according to some embodiments of the present invention.

Reference is now made to FIG. 11C showing a delta pattern for the images displayed in FIGS. 11A and 11B. As can be seen in FIG. 11C, the amplitudes in the leading direction (1302A) have a common sign while amplitudes of the trailing signals (1302B) have a common sign that it opposite that of the leading direction. The present inventors have found that such a structured pattern is typical in drag events and atypical in other events, e.g. lift or other touch events and may be used to distinguish between drag events and other events. In some exemplary embodiments, analysis of delta patterns is performed. Delta patterns showing a structure with outputs having a common sign in one area and adjacent outputs with an opposite sign may be identified as images corresponding to drag events.

Although an exemplary drag event that is parallel to one axis has been shown, it is noted that drag events may not necessarily be parallel to an axis, e.g. a 2 dimensional drag event may be detected.

Although the systems and methods of the present invention have been mostly described using a single object, the system and methods described herein may be similarly applied to digitizer systems having multi-touch capabilities.

Although the systems and methods of the present invention have been mostly described using a map of outputs from conductive sensors, the map of outputs implemented to correct readings may be readings at junctions of the sensor grid, e.g. the method applied for multi-touch detection.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

The terms "comprises", "comprising", "includes", "including", "having" and their conjugates mean "including but not limited to".

The term "consisting of means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

EXAMPLES

Reference is now made to the following examples, which together with the above descriptions illustrate some embodiments of the invention in a non limiting fashion.

Example 1

A Zero-State Image Appearing at the Initialization of the System

Figures 12A, 12B:
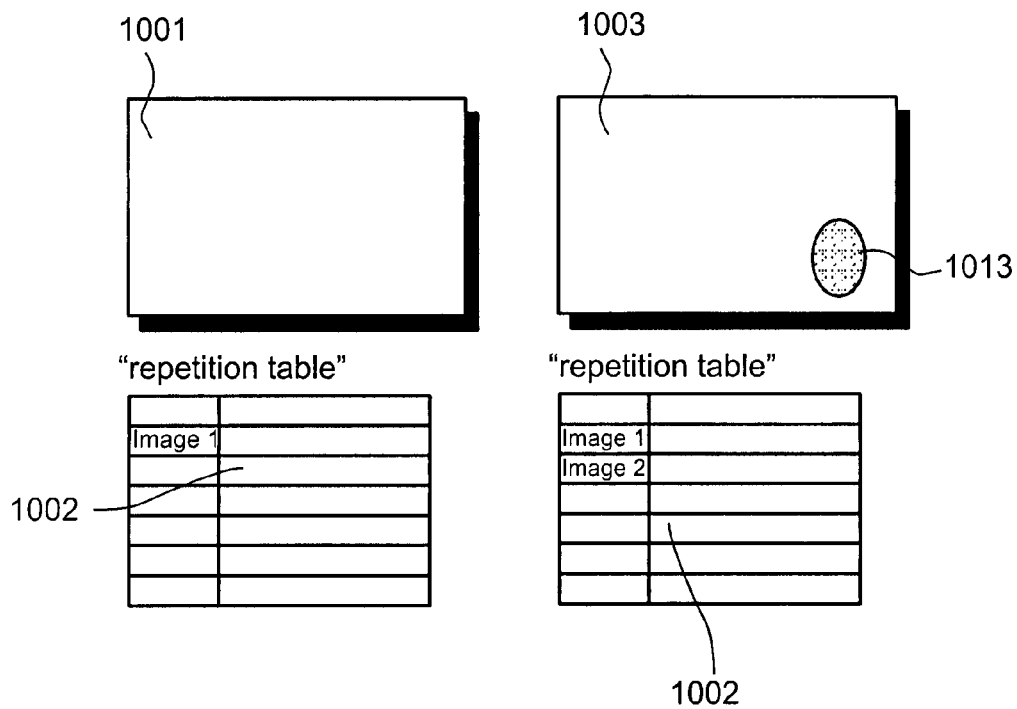
FIGS. 12A-12C are exemplary repetition table entries corresponding to a series of events detected on a digitizer sensor according to embodiments of the present invention.
Figure 12C:
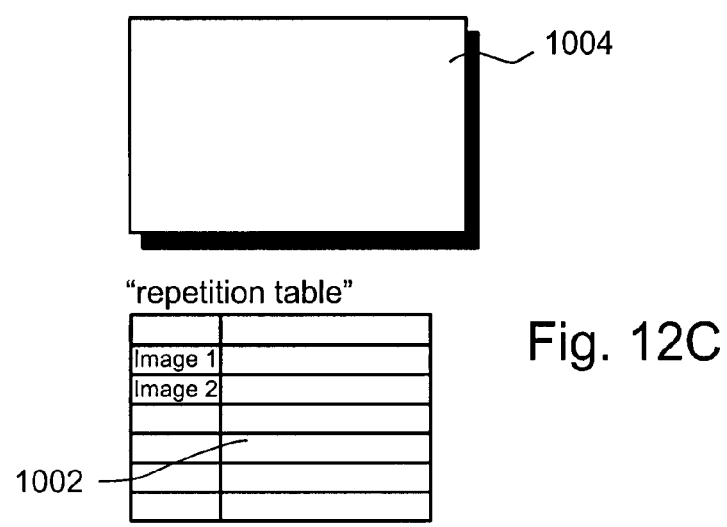
Figure 13A:
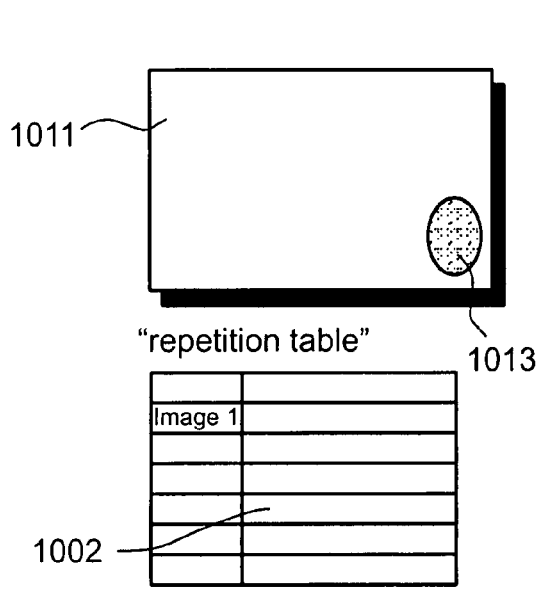
FIGS. 13A-13D are exemplary repetition table and candidate table entries corresponding to series of events detected on a digitizer sensor according to embodiments of the present invention.
Figure 13B:
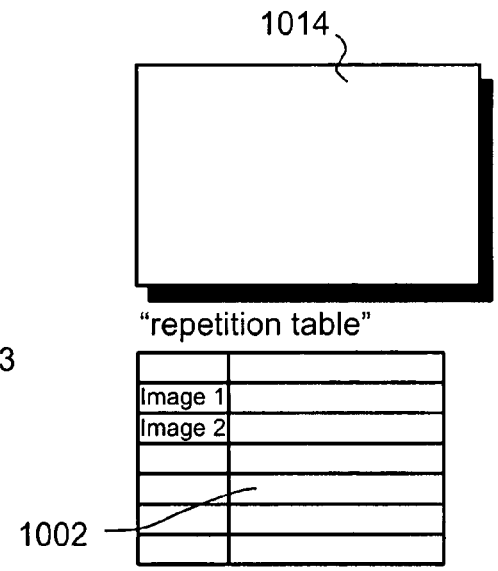
Figure 13C:
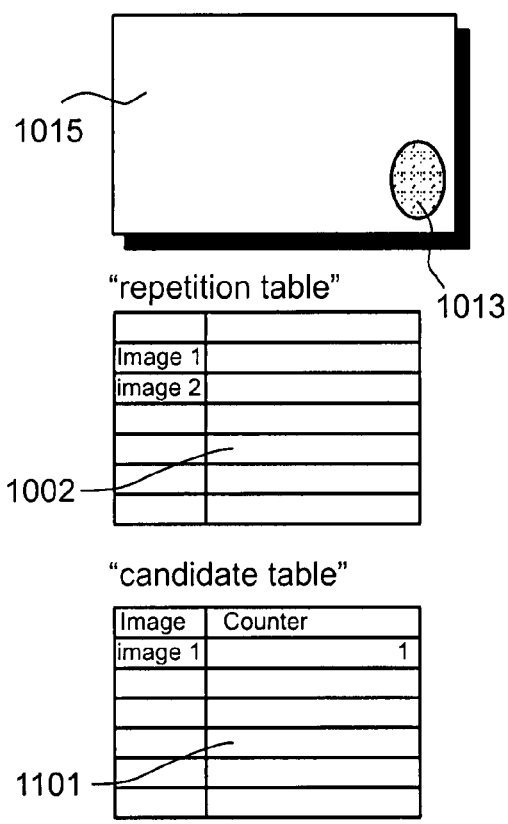
Figure 13D:
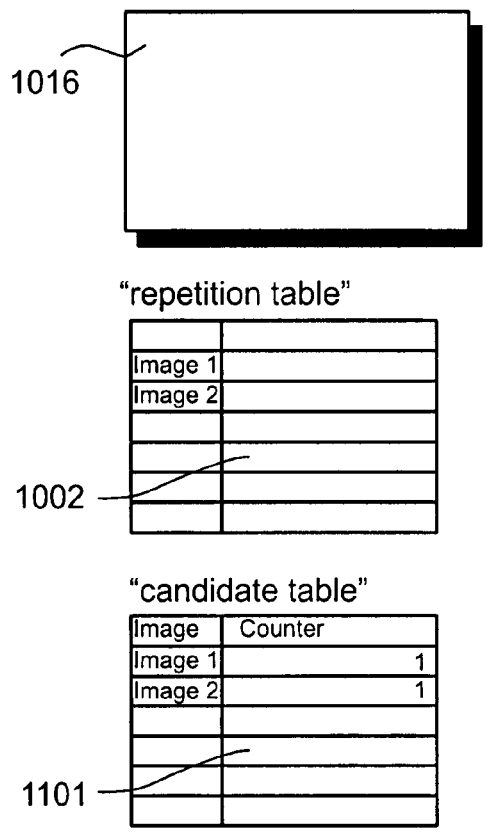

Reference is now made to FIG. 12 showing a first example of a system and method of the present invention. At the wake up of the system an initial state process begins and a first image 1001 is recorded on a repetition table 1002. The first image is an image of a lift event as no finger is positioned on the sensor (FIG. 12A). Zero-state detector proceeds to search for a new event. Once a user places a finger on the sensor (FIG. 12B) a new event is detected, since there is a change in the detected image 1003 in reference to the previous image 1001 (FIG. 12A). Since this image doesn't appear in the repetition table, current image 1003 is added to the repetition table (1002) as image2, and zero-state detector proceeds to search for a new event. In FIG. 12C, when the user's finger is removed from the sensor, a new event is detected, since there is a change in the detected image 1004 in reference to the previous image 1003 (FIG. 12B). Zero-state detector checks if this image appears in the repetition table and identifies it as a repetition of image1 appearing in the repetition table. Image 1 is currently defined as a candidate image and is stored in a candidate table (not shown). Zero-state detector now switches to a candidate state. Since image1 is a true zero-state image, after several times that the user places and removes the finger from the sensor, image1 will be repeated therefore will be qualified as an approved zero-state image.

Example 2

A Non Zero-State Image Appearing at the Initialization of the System

Reference is now made to FIG. 13 showing a second example of a system and method of the present invention. At the wake up of the system an initial state process begins and a first image 1011 is recorded on a repetition table 1002. The first image is an image of a touch event as a finger 1013 is positioned on the sensor (FIG. 13A). Zero-state detector proceeds to search for a new event. Once a user removes the finger from the sensor (FIG. 13B) a new event is detected, since there is a change in the detected image 1014 in reference to the previous image 1011 (FIG. 13A). Since this image doesn't appear in the repetition table, current image 1014 is added to the repetition table (1002) as image2, and zero-state detector proceeds to search for a new event. In a worst case scenario, the user may place a finger 1013 at the exact location on the sensor so as to produce an image 1015 similar to image1 as shown in FIG. 13C. In FIG. 13C, when the user's finger is positioned on the sensor, a new event is detected, since there is a change in the detected image 1015 in reference to the previous image 1014 (FIG. 13B). Zero-state detector checks if this image appears in the repetition table and identifies it as a repetition of image1 appearing in the repetition table. Image1 is currently defined as a candidate image and is stored in a candidate table 1101 (FIG. 13C). Zero-state detector switches to a candidate state and continues to search for new events. The next event is a lift event corresponding to image 1016. Image 1016 is compared to image1 and no match is found. Since a match was not found in the candidate table and image 1016 is not a drag event, image 1016 is compared to images in the repetition table and is found to match image2. Image2 is defined as a candidate image and stored in candidate table 1101. Since image2 is a true zero-state image, after several times that the user places and removes the finger from the sensor, image2 will be repeated and therefore will be qualified as an approved zero-state image.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claims is:

1. A method for calibration of a capacitive touch digitizer system, the method comprising:
   detecting patterns of signals from a plurality of different touch events and a plurality of different lift events over a course of user interaction with the capacitive touch digitizer system, wherein the patterns of signals are outputs from a digitizer sensor of the capacitive touch digitizer system;
   determining a number of times that a pattern of signals from the patterns of signals detected is repeated over different events;
   identifying that the pattern of signals that is repeated represents a pattern of signals from a lift event, responsive to the number of repetitions being above a pre-defined repletion threshold; and
   defining a map of offset values as the pattern of signals that is repeated above the pre-defined repetition threshold.

2. The method according to claim 1 wherein the defining a map of offset values is performed automatically without user intervention for invoking the defining.

3. The method according to claim 1 comprising identifying an onset of a new event and selecting a representative pattern of signals from the new event.

4. The method according to claim 3 wherein the new event is detected in response to a change in at least one digitizer sensor output by a magnitude above a pre-defined event threshold.

5. The method according to claim 3 wherein the representative pattern of signals is the first pattern of signals sampled during the event.

6. The method according to claim 3 wherein the representative pattern of signals is an average of a plurality of patterns of signals sampled during the event.

7. The method according to claim 1 wherein the touch events are periods during which a user interaction invokes signals on the digitizer sensor, and wherein the lift events are periods over which an object used for user interaction is away from the digitizer sensor such that the object does not invoke signals on the digitizer sensor.

8. The method according to claim 7 wherein the object for user interaction is a finger.

9. The method according to claim 1 comprising:
   determining stability of the events, wherein stability is determined for an event that includes a pre-defined number of samples with a consistent pattern of signals; and
   excluding events that are not stable from consideration for determining the number of times that the pattern of signals is repeated over the different events.

10. The method according to claim 1 comprising:
    detecting a drag event, wherein a drag event is a period over which an object is dragged along the digitizer sensor; and
    excluding drag events from consideration when determining the number of times that the pattern of signals is repeated over the different events.

11. The method according to claim 10 comprising:
    calculating delta patterns, wherein a delta pattern is the difference between a previous pattern of signals and a current pattern of signals;
    determining if the delta pattern depicts a drag event; and
    defining the previous and the current pattern of signals as patterns of signals derived from a drag event.

12. The method according to claim 11 wherein the drag event includes outputs with a common sign in a first area on the digitizer sensor and outputs with an opposite sign in a second area adjacent to the first area on the digitizer sensor.

13. The method according to claim 1 wherein the offset values are implemented to calibrate readings of digitizer sensor outputs.

14. The method according to claim 1 comprising: saving at least one map of offset values in non-volatile memory.

15. The method according to claim 1 comprising saving at least one map of offset values, wherein the map is determined from a manually initiated calibration procedure and updated during user interaction with the digitizer sensor of the capacitive touch digitizer system.

16. The method according to claim 1 comprising saving at least one map of offset values, wherein the map is determined from a previous calibration procedure.

17. The method according to claim 1 comprising updating the map of offset values in response to detection of repetitive patterns of signals that are different than the pattern of signals implemented to define the map.

18. The method according to claim 1 comprising recording at least one of the patterns of signals detected from the plurality of different events in a repetition table.

19. The method according to claim 18 comprising comparing detected patterns of signals to patterns of signals stored in the repetition table.

20. The method according to claim 1 comprising storing a pattern of signals that is repeated at least once in a candidate table.

21. The method according to claim 20 comprising selecting the pattern of signals to be implemented as a map of the offset values from patterns of signals stored in the candidate table.

22. The method according to claim 1 comprising adjusting the pattern of signals implemented as a map of offsets to slow changes detected in the same event.

23. The method according to claim 1 wherein the pattern of signals includes outputs from a plurality of conductive lines of the digitizer sensor arranged in a grid.

24. The method according to claim 23 wherein the outputs from the digitizer sensor are outputs from sensor junctions.

25. The method according to claim 1 wherein the outputs from the digitizer sensor are outputs from differential amplifiers of the digitizer sensor.

26. The method according to claim 1 wherein the pattern of signals forms a two dimensional image.

27. The method according to claim 1 wherein the pattern of signals forms a one dimensional image on each axis of the digitizer sensor.

28. A capacitive touch digitizer system comprising:
a capacitive touch digitizer system configured for detecting a presence of an object over a digitizer sensor of the capacitive touch digitizer system;
a zero-state detector configured for:
detecting patterns of signals from a plurality of different touch events and a plurality of different lift events over the course of user interaction with the capacitive touch digitizer system, wherein the patterns of signals are outputs from the digitizer sensor;
determining a number of times that a pattern of signals is repeated over different events; and
identifying that the pattern of signals that is repeated over the different events represents a pattern of signals from a lift event, responsive to the number of repetitions being above a pre-defined repletion threshold;
defining a map of offset values as the pattern of signals that is repeated above the pre-defined repetition threshold.

29. The system according to claim 28 wherein the zero-state detector is configured for defining the map of offset values automatically without user intervention for invoking the defining.

30. The system according to claim 28 wherein the zero-state detector is configured for identifying an onset of a new event and selecting a representative pattern of signals from the new event.

31. The system according to claim 30 wherein the zero-state detector is configured to detect the new event in response to a change in at least one digitizer sensor output by a magnitude above a pre-defined event threshold.

32. The system according to claim 30 wherein the representative pattern of signals is the first pattern of signals sampled during the event.

33. The system according to claim 30 wherein the representative pattern of signals is an average of a plurality of patterns of signals sampled during the event.

34. The system according to claim 28 wherein the touch events are periods during which an object invokes signals on the digitizer, and wherein the lift events are periods over which the object is away from the digitizer sensor such that the object does not invoke signals on the digitizer.

35. The system according to claim 28 wherein the zero-state detector is configured for determining stability of the events, wherein stability is determined for an event that includes a pre-defined number of samples with a consistent pattern of signals; and for excluding events that are not stable from consideration for determining the number of times that the pattern of signals is repeated over the different events.

36. The system according to claim 28 wherein the zero-state detector is configured for:
detecting a drag event, wherein a drag event is a period over which an object is dragged along the digitizer sensor; and
excluding drag events from consideration when determining the number of times that the pattern of signals is repeated over the different events.

37. The system according to claim 36 wherein the zero-state detector is configured for:
calculating delta patterns, wherein a delta pattern is the difference between a previous pattern of signals and a current pattern of signals; and
determining if the delta pattern depicts a drag event; and
defining the previous and the current pattern of signals as patterns of signals derived from a drag event.

38. The system according to claim 37 wherein the drag event includes outputs with a common sign in a first area on the digitizer sensor and outputs with an opposite sign in a second area adjacent to the first area on the digitizer sensor.

39. The system according to claim 28 comprising a compensator, wherein the compensator is configured using the offset values for calibrating readings of digitizer sensor outputs.

40. The system according to claim 28 comprising a non-volatile memory configured for storing at least one map of offset values.

41. The system according to claim 40 wherein the at least one map of offset values is a map determined from a manually initiated calibration procedure that is updated during user interaction with a digitizer sensor of the capacitive touch digitizer system.

42. The system according to claim 40 wherein the at least one map of offset values is a map determined from a previous calibration procedure.

43. The system according to claim 28 wherein the zero-state detector is configured for updating the map of offset values in response to detection of repetitive patterns of signals that are different than the pattern of signals implemented to define the map.

44. The system according to claim 28 wherein the zero-state detector is configured for recording at least one of the patterns of signals detected from the plurality of different events in a repetition table.

45. The system according to claim 44 comprising memory for storing the repetition table.

46. The system according to claim 45 wherein the memory is volatile memory.

47. The system according to claims 44 wherein the zero-state detector is configured for comparing detected patterns of signals to patterns of signals stored in the repetition table.

48. The system according to claim 28 comprising memory configured for storing a pattern of signals that is repeated at least once in a candidate table.

49. The system according to claim 48 comprising memory configured for storing the candidate table.

50. The system according to claim 49 wherein the memory is volatile memory.

51. The system according to claim 48 wherein the zero-state detector is configured for selecting the pattern of signals to be implemented as a map of the offset values from patterns of signals stored in the candidate table.

52. The system according to claim 28 wherein the zero-state detector is configured for adjusting the pattern of signals implemented as a map of offsets to slow changes detected in the same event.

53. The system according to claim 28 wherein the digitizer sensor includes a plurality of conductive lines arranged in a grid; and wherein the pattern of signals includes outputs from the plurality of conductive lines of the grid.

54. The system according to claim 53, wherein pairs of the conductive lines are coupled to a differential amplifier through which a difference signal is detected and wherein the outputs from the digitizer system are outputs form differential amplifiers.

55. The system according to claim 53 wherein the outputs from the digitizer system are outputs from junctions of conductive lines of the digitizer sensor.

56. The system according to claim 28 wherein the object is a finger.

57. The system according to claim 28 wherein the pattern of signals forms a two dimensional image.

58. The system according to claim 28 wherein the pattern of signals forms a one dimensional image on each axis of the digitizer sensor.

59. A method for detecting a drag event performed on a capacitive touch digitizer system, wherein a drag event is a period over which an object is dragged along a digitizer sensor of the capacitive touch digitizer system, the method comprising:
   detecting a patterns of signals from at least a current event and a a pattern of signals from a previous events over a course of user interaction with the capacitive touch digitizer system, wherein the patterns of signals are outputs from a grid based digitizer sensor of the capacitive touch digitizer system, said pattern of signals forming a two dimensional image;
   calculating a delta patterns, wherein the delta pattern is the difference between a pattern of signals from the previous event and a pattern of signals from the current event; and
   determining that the previous event is a drag event, responsive to identifying a change in sign across the delta pattern.

60. The method according to claim 59 comprising identifying an onset of a new event and selecting a representative pattern of signals from the new event.

61. The method according to claim 60 wherein the new event is detected in response to a change in at least one digitizer sensor output by a magnitude above a pre-defined event threshold.

62. The method according to claim 59 wherein the different events include different lift and touch events, wherein the touch events are periods during which a user interaction invokes signals on the digitizer sensor, and wherein the lift events are periods over which the object for user interaction is away from the digitizer sensor such that the object does not invoke signals on the digitizer sensor.

63. The method according to claim 59 wherein the delta patterns depicting the drag events includes outputs with a common sign in a first area on the digitizer sensor and outputs with an opposite sign in a second area adjacent to the first area on the digitizer sensor.

64. The method according to claim 59 comprising:
   defining the previous and the current pattern of signals as patterns of signals derived from a drag event in the case that the pattern is determined to be a drag event.

65. The method according to claim 59 wherein the object is a finger.

66. The method according to claim 59 wherein the pattern of signals includes outputs from a plurality of conductive lines of the digitizer sensor arranged in a grid.

67. The method according to claim 59 wherein the outputs from the digitizer sensor are outputs form differential amplifiers of the digitizer sensor.

68. The method according to claim 67 wherein the outputs from the digitizer sensor are outputs from sensor junctions.

69. The method according to claim 59 wherein the pattern of signals forms a two dimensional image.

70. The method according to claim 59 wherein the pattern of signals forms a one dimensional image on each axis of the digitizer sensor.

* * * * *